US009154874B2

(12) United States Patent
Ura

(10) Patent No.: US 9,154,874 B2
(45) Date of Patent: Oct. 6, 2015

(54) HOWLING DETECTION DEVICE, HOWLING SUPPRESSING DEVICE AND METHOD OF DETECTING HOWLING

(75) Inventor: Takefumi Ura, Ehime (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 375 days.

(21) Appl. No.: 13/819,778

(22) PCT Filed: Feb. 24, 2012

(86) PCT No.: PCT/JP2012/001294
§ 371 (c)(1), (2), (4) Date: Feb. 28, 2013

(87) PCT Pub. No.: WO2012/120815
PCT Pub. Date: Sep. 13, 2012

(65) Prior Publication Data

US 2013/0156205 A1 Jun. 20, 2013

(30) Foreign Application Priority Data

Mar. 9, 2011 (JP) ................................ 2011-051623

(51) Int. Cl.
*H04R 29/00* (2006.01)
*H04B 15/00* (2006.01)
(Continued)

(52) U.S. Cl.
CPC ................ *H04R 3/02* (2013.01); *H04R 25/453* (2013.01)

(58) Field of Classification Search
CPC ........................................................ H04R 3/02
USPC ............................................... 381/56, 83, 93
See application file for complete search history.

(56) References Cited

U.S. PATENT DOCUMENTS

2006/0198532 A1 9/2006 Tashiro
2007/0280487 A1 12/2007 Ura et al.
2009/0080674 A1 3/2009 Ura

FOREIGN PATENT DOCUMENTS

CN 1622193 A 6/2005
CN 1934897 A 3/2007
(Continued)

OTHER PUBLICATIONS

Machine Translation of International Publication No. 2006043367, Ura et al., Apr. 27, 2006 (also known as Japanese Application No. 2005015723).*

(Continued)

*Primary Examiner* — Paul S Kim
*Assistant Examiner* — Katherine Faley
(74) *Attorney, Agent, or Firm* — Pearne & Gordon LLP

(57) ABSTRACT

A howling detection device capable of detecting the occurrence of howling with a higher degree of accuracy is provided. The howling detection device includes a signal level calculating unit calculating, from the input signal, an input signal level being the signal level of an input signal at each given time, a level fluctuation estimated value calculating unit calculating, from the input signal level, a level fluctuation estimated value being a value gradually increasing or decreasing by a given amount with time, a threshold value calculating unit calculating, from the level fluctuation estimated value, a level threshold value changing in accordance with the level fluctuation estimated value, and a howling determination unit which determines that howling occurs in an input signal under the condition that the input signal level being higher than the level threshold value continues for a given time.

13 Claims, 14 Drawing Sheets

(51) Int. Cl.
*H04R 3/02* (2006.01)
*H04R 25/00* (2006.01)

(56) References Cited

FOREIGN PATENT DOCUMENTS

| | | | |
|---|---|---|---|
| CN | 101199233 | A | 6/2008 |
| EP | 1471765 | A2 | 10/2004 |
| EP | 2337376 | A1 | 6/2011 |
| JP | 05-308697 | A | 11/1993 |
| JP | 06-261391 | A | 9/1994 |
| JP | 07-254870 | A | 10/1995 |
| JP | 08-223684 | A | 8/1996 |
| JP | 2006-245716 | A | 9/2006 |
| JP | 2007-274640 | A | 10/2007 |
| JP | 2010-178224 | A | 8/2010 |
| JP | 2010-245992 | A | 10/2010 |
| WO | 2006043367 | A1 | 4/2006 |

OTHER PUBLICATIONS

International Search Report for PCT/JP2012/001294 dated Apr. 3, 2012.
Extended European Search Report for Application No. 12755639.7 dated Sep. 24, 2014.
English translation of Search Report for Chinese Application No. 2012800025258 dated Jun. 1, 2015.

* cited by examiner

HOWLING DETECTION DEVICE, HOWLING SUPPRESSING DEVICE AND METHOD OF DETECTING HOWLING

TECHNICAL FIELD

The present invention relates to a howling detection apparatus, howling suppression apparatus, and howling detection method.

BACKGROUND ART

With an acoustic apparatus that amplifies speech input from a microphone and outputs that speech from a speaker, howling occurs when speaker output sound is fed back to the microphone. This is due to the fact that acoustic coupling occurs between the speaker and the microphone, and an acoustic feedback loop is formed.

Howling is a loud continuous sound that is unpleasant for a listener, and there are consequently various kinds of technologies for suppressing howling. However, it is difficult to detect and suppress howling at high speed and with a high degree of accuracy before a listener becomes aware of the occurrence of howling.

A technology that detects howling is described in Patent Literature 1, for example. The technology described in Patent Literature 1 (hereinafter referred to as "conventional technology") calculates the signal level of an input signal from a microphone, and compares the calculated signal level with a predetermined threshold value. The conventional technology then determines that howling has occurred in the input signal, taking the continuation for a predetermined time of a state in which the signal level exceeds the threshold value as a condition. Using such technology enables howling to be suppressed.

CITATION LIST

Patent Literature

PTL 1

Patent Document 1: Japanese Patent Application Laid-Open No. HET 7-254870

SUMMARY OF INVENTION

Technical Problem

However, a problem with the conventional technology is that it may not be possible to detect howling with a high degree of accuracy, depending on the acoustic environment of the microphone. The reason for this is that when there is speech, noise, or the like in the vicinity, the signal level may exceed the threshold value even though howling has not occurred, and the occurrence of howling may be erroneously detected. Also, conversely, if a high threshold value is set in order to prevent such erroneous detection, howling may be difficult to detect.

It is an object of the present invention to detect the occurrence of howling with a high degree of accuracy.

Solution to Problem

A howling detection apparatus of the present invention has: a signal level calculation section that calculates, from an input signal, an input signal level that is the signal level of the input signal at each predetermined time; a level fluctuation estimated value calculation section that calculates a level fluctuation estimated value that is a value that gradually increases or gradually decreases by a predetermined amount from the input signal level over time; a threshold value calculation section that calculates, from the level fluctuation estimated value, a level threshold value that changes according to the level fluctuation estimated value; and a howling determination section that determines that howling has occurred in an input signal on a condition that a state in which the input signal level exceeds the level threshold value continues for a predetermined time.

A howling detection method of the present invention has: a step of calculating, from an input signal, an input signal level that is the signal level of the input signal at each predetermined time; a step of calculating a level fluctuation estimated value that is a value that gradually increases or gradually decreases by a predetermined amount from the input signal level over time; a step of calculating, from the level fluctuation estimated value, a level threshold value that changes according to the level fluctuation estimated value; and a step of determining that howling has occurred in an input signal on a condition that a state in which the input signal level exceeds the level threshold value continues for a predetermined time.

Advantageous Effects of Invention

The present invention enables the occurrence of howling to be detected with a high degree of accuracy.

DESCRIPTION OF EMBODIMENTS

Now, embodiments of the present invention will be described in detail with reference to the accompanying drawings.

(Embodiment 1)

Figure 1:
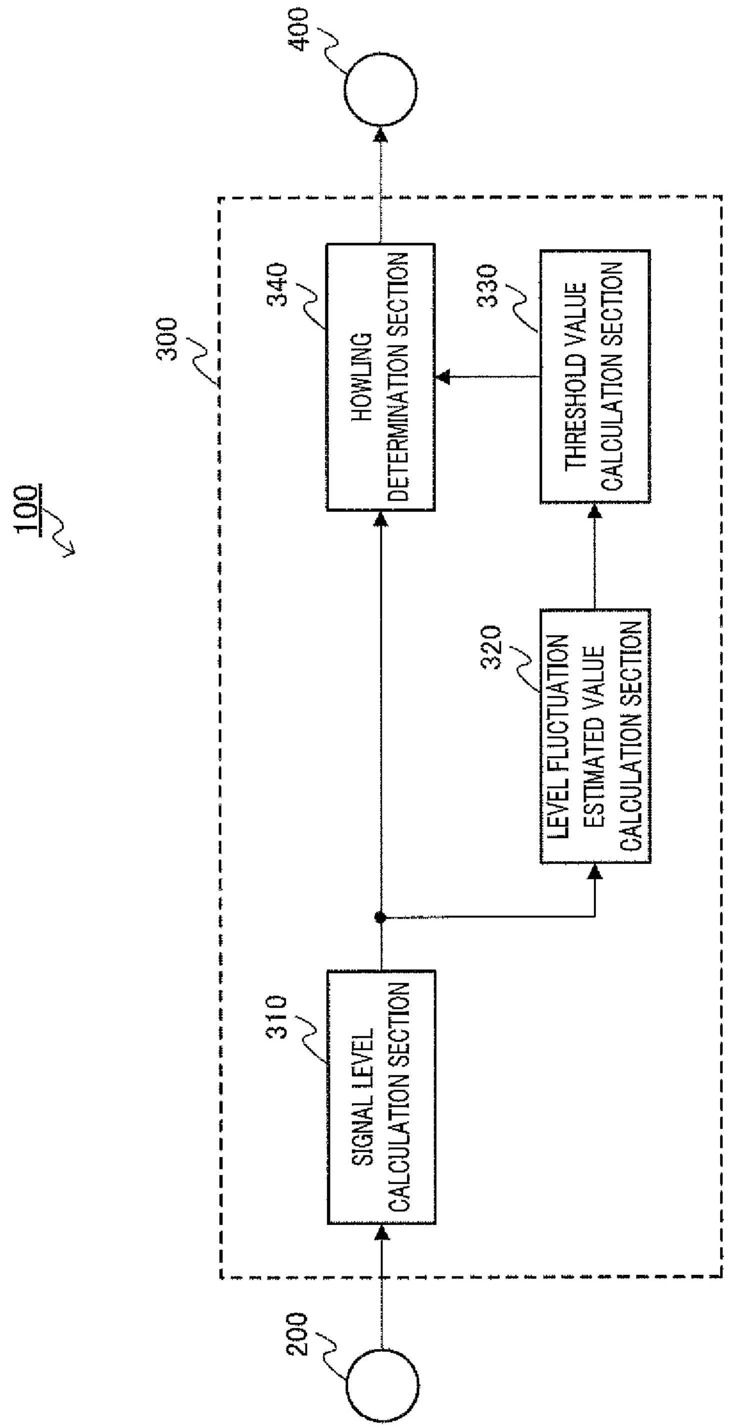
FIG. 1 is a block diagram showing an example of the configuration of a howling detection apparatus according to Embodiment 1 of the present invention.

FIG. 1 is a block diagram showing an example of the configuration of a howling detection apparatus according to this embodiment.

In FIG. 1, howling detection apparatus 100 includes input terminal 200, signal level calculation section 310, level fluctuation estimated value calculation section 320, threshold value calculation section 330, howling determination section 340, and output terminal 400.

Input terminal 200 is a terminal for connection to a device, such as a microphone or the like (not shown), that outputs a speech signal. Input terminal 200 inputs a speech signal output from a connected microphone, and outputs the signal to signal level calculation section 310. Below, a speech signal input by input terminal 200 is referred to simply as an "input signal."

Signal level calculation section 310 calculates from an input signal at each predetermined time an input signal level that is the signal level of the input signal. Specifically, signal level calculation section 310 calculates an input signal level that is power or an absolute value of an input signal per unit time, and outputs to level fluctuation estimated value calculation section 320 and howling determination section 340.

Level fluctuation estimated value calculation section 320 calculates a level fluctuation estimated value, and outputs to threshold value calculation section 330.

Accordingly, a level fluctuation estimated value is a value that gradually increases or gradually decreases by a predetermined amount from the input signal level over time. More specifically, a level fluctuation estimated value is, for example: a value that gradually increases by a predetermined amount from a minimum input signal level value, a value that gradually decreases by a predetermined amount from a maximum input signal level value, or a value that gradually increases or gradually decreases by a predetermined amount from an average input signal level value. That is to say, a level fluctuation estimated value is a value that is sequentially updated in accordance with transitions of an input signal level, and tracks these transitions in a state in which the update amount per predetermined time (assumed to be an increment amount in this embodiment) is limited. In other words, a level fluctuation estimated value is a time-variant estimated value of an input signal level.

Accordingly, it is assumed that level fluctuation estimated value calculation section 320 treats a transition of the minimum input signal level value as an input signal level transition (input signal level fluctuation range transition). That is to say, a case is described here in which a value that gradually increases by a predetermined amount from the minimum input signal level value over time is taken as a level fluctuation estimated value.

Threshold value calculation section 330 calculates from a level fluctuation estimated value a first threshold value (level threshold value) that changes according to the level fluctuation estimated value, and outputs to howling determination section 340. That is to say, a level fluctuation estimated value is a reference signal that is the reference for the first threshold value.

Howling determination section 340 measures the duration of a state in which the input signal level exceeds the first threshold value. Then howling determination section 340 determines that howling has occurred in the input signal, on the condition that the measured duration has reached a predetermined time threshold value. Howling determination section 340 then outputs the determination result to output terminal 400 as a howling detection result.

Output terminal 400 is a terminal of an amplifier or the like for amplifying speech input to the above microphone and outputting the speech from a speaker. Output terminal 400 outputs a howling detection result to an acoustic control apparatus having a function of suppressing howling.

Howling detection apparatus 100 is, for example, a computer that includes a CPU (central processing unit), a storage medium such as RAM (random access memory), and so forth. In this case, howling detection apparatus 100 operates by having the CPU execute a stored control program. Accordingly, this embodiment comprising a signal level calculation section 310, level fluctuation estimated value calculation section 320, threshold value calculation section 330, and howling determination section 340 may be treated as howling detection section 300 incorporated in howling detection apparatus 100.

Howling detection apparatus 100 according to this embodiment calculates a level fluctuation estimated value that is a value that gradually increases by a predetermined amount from the minimum input signal level value over time. Then howling detection apparatus 100 performs howling determination based on whether or not a state in which a threshold value that changes according to this level fluctuation estimated value is exceeded continues in excess of a predetermined time threshold value. By this means, howling detection apparatus 100 can reduce both erroneous detection and non-detection of howling irrespective of the noise level.

The reason for this is as follows. When howling occurs, it continues at the level of occurrence. Below, such an input signal level state that appears as a characteristic of howling is referred to as a "howling state," and a howling state interval is referred to as a "howling interval." Also, various kinds of sound generally present in daily activities are referred to as "noise" to distinguish them from howling, and a state in which noise is generated is referred to as a "noise state."

The above-described first threshold value makes a transition based on a level fluctuation estimated value that tracks a transition of the minimum input signal level value. The minimum input signal level value increases when noise increases. Therefore, howling determination by means of a comparison with a first threshold value according to this embodiment enables the possibility of erroneously detecting noise as howling to be reduced.

However, this kind of howling determination may increase the possibility of not detecting howling. Thus, level fluctuation estimated value calculation section 320 calculates a level fluctuation estimated value corresponding to an input signal level fluctuation range as described above. Specifically, level fluctuation estimated value calculation section 320 generates a level fluctuation estimated value that gradually increases by a predetermined amount from the minimum input signal level value over time, that is, a level fluctuation estimated value having low tracking capability with respect to an increase in the input signal level.

In a howling interval, the input signal level continues at the level of occurrence, as described above, and therefore a value close to the maximum value is continued for a predetermined time. Thus, if the input signal level is low compared to a level fluctuation estimated value, howling detection apparatus 100 according to this embodiment replaces the level fluctuation estimated value with the input signal level value. Also, if the input signal level is high compared to a level fluctuation estimated value, howling detection apparatus 100 gradually increases the level fluctuation estimated value. This kind of level fluctuation estimated value characteristic makes it possible to set a fluctuation threshold value to be smaller than the maximum value of the input signal level fluctuation range in a howling interval, and reduces the possibility of not detecting howling.

However, with this kind of howling determination, there is a risk of noise with a high input signal level also erroneously being detected as howling. Thus, as described above, howling determination section 340 only determines howling to have occurred in an input signal when a state in which the input signal level exceeds the first threshold value continuously exceeds a predetermined time threshold value. With most noise, the input signal level is temporarily or intermittently high, and does not continue at the level of occurrence. Therefore, by performing this kind of howling determination, howling detection apparatus 100 can reduce both erroneous detection and non-detection of howling.

The operation of howling detection apparatus 100 will now be described.

Figure 2:
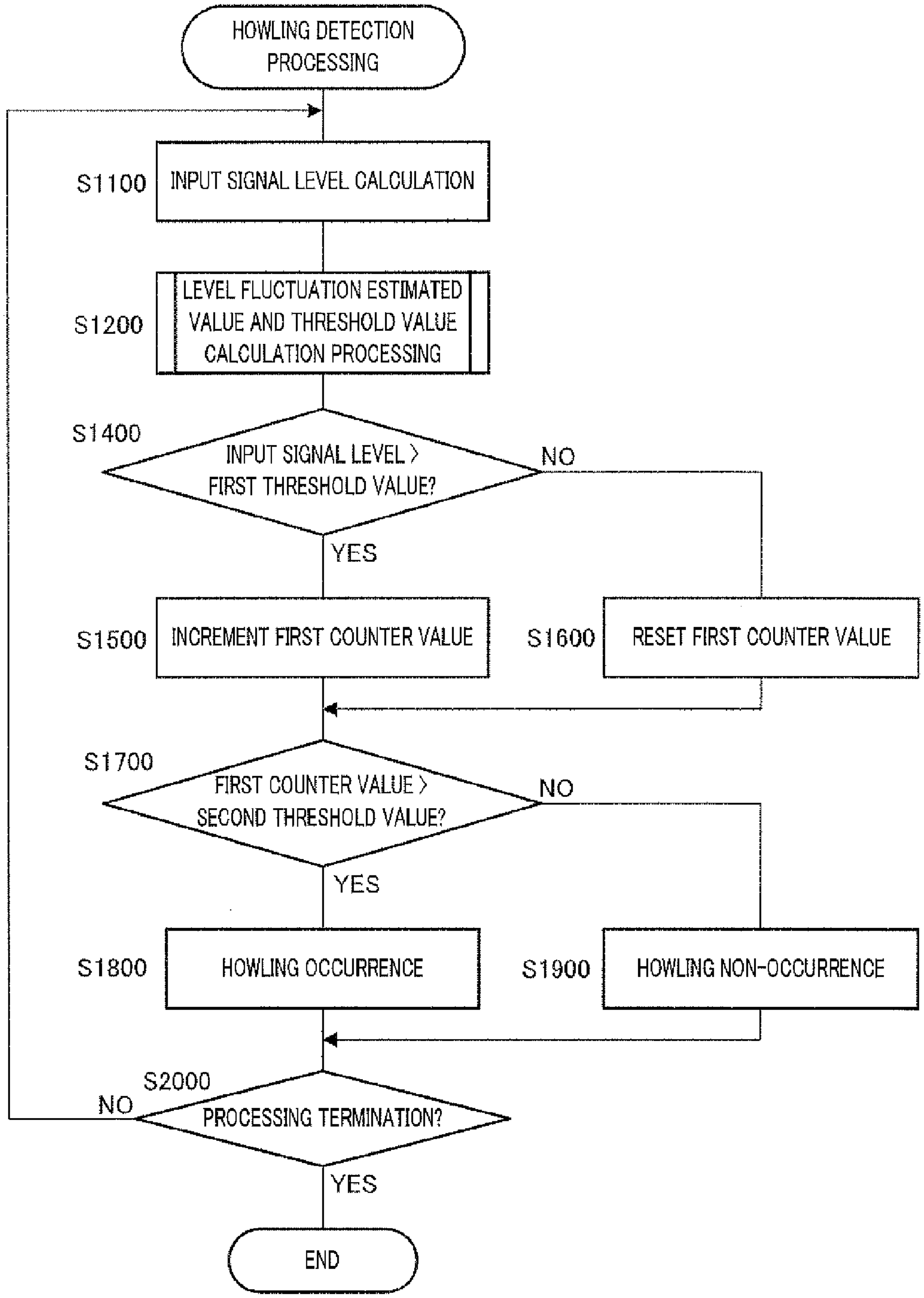
FIG. 2 is a flowchart showing an example of the operation of the howling detection apparatus according to Embodiment 1.

FIG. 2 is a flowchart showing an example of the operation of howling detection apparatus 100.

First, in step S1100, signal level calculation section 310 calculates an input signal level from an input signal. Signal level calculation section 310 performs input signal level calculation by determining the power or an absolute value of the input signal for each sample (for example, every 0.0625 [ms] at 16 [kHz] sampling) or for each frame (a plurality of samples). Therefore, howling detection apparatus 100 repeatedly performs the processing from step S1100 to step S2000 every predetermined sampling time.

Then, in step S1200, level fluctuation estimated value calculation section 320 performs level fluctuation estimated value and threshold value calculation processing. Here, level fluctuation estimated value and threshold value calculation processing is processing that calculates a level fluctuation estimated value that tracks the minimum input signal level value.

Figure 3:
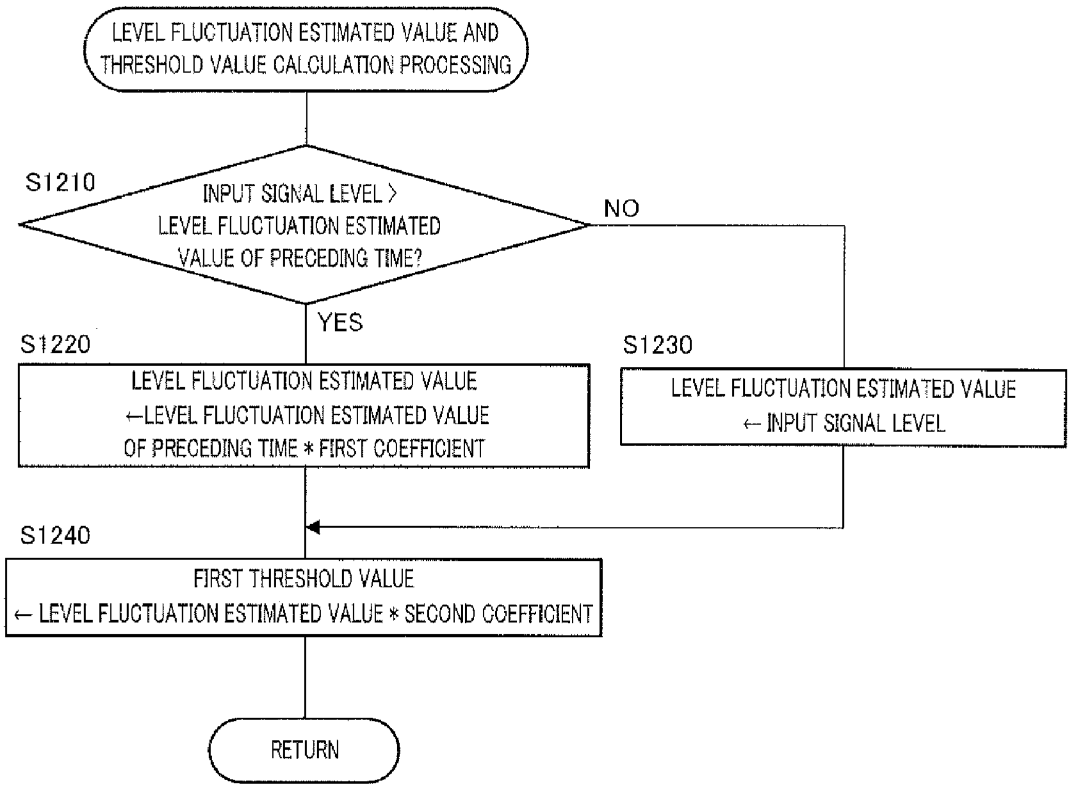
FIG. 3 is a flowchart showing an example of level fluctuation estimated value and threshold value calculation processing in Embodiment 1.

FIG. 3 is a flowchart showing an example of level fluctuation estimated value and threshold value calculation processing in step S1200.

In step S1210, level fluctuation estimated value calculation section 320 determines whether or not the input signal level calculated in the current cycle exceeds the level fluctuation estimated value calculated in the preceding cycle (hereinafter referred to simply as "the level fluctuation estimated value"). The input signal level calculated in the current cycle is hereinafter referred to simply as "the input signal level". If the input signal level exceeds the level fluctuation estimated value (S1210: YES), level fluctuation estimated value calculation section 320 proceeds to step S1220. If the input signal level does not exceed the level fluctuation estimated value, or if this is the first cycle and a level fluctuation estimated value has not yet been calculated, (S1210: NO), level fluctuation estimated value calculation section 320 proceeds to step S1230.

In step S1220, level fluctuation estimated value calculation section 320 updates the level fluctuation estimated value by a value obtained by multiplying the level fluctuation estimated value by a predetermined first coefficient, and proceeds to step S1240.

Thus, the first coefficient is a value that enables the minimum input signal level value to be traced, and that exceeds 1. In other words, the first coefficient decides the magnitude (or amount) of increase of the level fluctuation estimated value when a state in which the input signal level is large continues.

More specifically, the first coefficient is a value that tracks the level fluctuation estimated value virtually in real time for a gradual input signal level increase; for example, the sound of a train running. Furthermore, the first coefficient is a value such as to perform delayed tracking of the level fluctuation estimated value for an abrupt input signal level increase such as in the case of howling. In this embodiment, the first coefficient is assumed to be a value decided based on experimentation.

Level fluctuation estimated value calculation section 320 may also update the level fluctuation estimated value by a value obtained by adding a predetermined constant to the level fluctuation estimated value. In this case, the first coefficient is a value exceeding 0.

In step S1230, level fluctuation estimated value calculation section 320 updates the level fluctuation estimated value by the input signal level, and proceeds to step S1240.

In step S1240, threshold value calculation section 330 calculates a value obtained by multiplying the updated level fluctuation estimated value by a predetermined second coefficient as a first threshold value, and returns to the processing in FIG. 2. Here, the second coefficient is a value exceeding 1. Furthermore, the second coefficient is a value such that the input signal level does not become less than or equal to the first threshold value at least at the beginning of a howling interval in tracking of an input signal level transition of the level fluctuation estimated value determined by the first coefficient.

Then, in step S1400 in FIG. 2, howling determination section 340 determines whether or not the input signal level exceeds the first threshold value. If the input signal level exceeds the first threshold value (S1400: YES), howling determination section 340 proceeds to step S1500. If the input signal level does not exceed the first threshold value (S1400: NO), howling determination section 340 proceeds to step S1600.

In step S1500, howling determination section 340 increments a first counter value and proceeds to step S1700.

In step S1600, howling determination section 340 resets the first counter value and proceeds to step S1700.

Since howling detection apparatus 100 repeatedly performs each processing at each predetermined sampling time in the above-described way, the first counter value indicates the length of time for which the input signal level continuously exceeds the first threshold value. For example, if the sampling time is 0.0625 [ms], a first counter value of 1600 indicates that the input signal level exceeds the first threshold value continuously for 100 [ms].

In step S1700, howling determination section 340 determines whether or not the first counter value exceeds a predetermined second threshold value (time threshold value).

Here, the second threshold value is a value corresponding to a time shorter than the minimum time for which the input signal level continuously exceeds the first threshold value at the beginning of a howling interval in tracking of an input signal level transition of the first threshold value determined by the first coefficient and second coefficient. Furthermore, the second threshold value is a value corresponding to a time longer than the maximum time for which an input signal level including noise continuously exceeds the first threshold value in the above tracking. The second threshold value is, for example, a value equivalent to 0.5 second to 1 second.

In this embodiment, a combination of a first coefficient, second coefficient, and second threshold value such that howling is detected and noise is not detected is assumed to be found by performing experimentation or simulations for various noise environments.

If the first counter value exceeds the second threshold value (S1700: YES), howling determination section 340 proceeds to step S1800. If the first counter value does not exceed the second threshold value (S1700: NO), howling determination section 340 proceeds to step S1900.

In step S1800, howling determination section 340 determines that howling has occurred. Then howling determination section 340 outputs a determination result indicating that howling has occurred via output terminal 400, and proceeds to step S2000. This is because a state in which the input signal level is high can be said to have continued for a considerable time.

In step S1900, howling determination section 340 determines that howling has not occurred, and proceeds directly to step S2000. This is because it can be said that a state in which the input signal level is high has not occurred, or has occurred but has not continued for a considerable time.

Howling determination section 340 may also output a determination result indicating that howling has not occurred via output terminal 400. Here, it is assumed that howling determination section 340 turns on a detection flag indicating that howling is occurring each time a transition is made from a state in which howling is not occurring to a state in which howling is occurring. It is also assumed that howling determination section 340 turns off the detection flag each time a transition is made from a state in which howling is occurring to a state in which howling is not occurring.

Then, in step S2000, signal level calculation section 310 determines whether or not termination of howling determination processing has been directed by means of a user operation or the like. If termination of processing has not been directed (S2000: NO), signal level calculation section 310 returns to step S1100 and performs processing for the next cycle. If termination of processing has been directed (S2000: YES), signal level calculation section 310 terminates the series of processing steps.

By means of the above-described processing, howling detection apparatus 100 can acquire a first threshold value based on the input signal of the preceding cycle, and determine the occurrence of howling based on whether or not a state in which the input signal level exceeds the threshold has continued for a predetermined time.

As described above, howling detection apparatus 100 according to this embodiment calculates a level fluctuation estimated value that is a value that gradually increases by a predetermined amount from the minimum input signal level value over time. Then howling detection apparatus 100 performs howling determination based on whether or not a state in which a threshold value that changes according to the calculated level fluctuation estimated value is exceeded continues in excess of a predetermined time threshold value. By this means, howling detection apparatus 100 can reduce both erroneous detection and non-detection of howling irrespective of the noise level.

As stated above, a conventional apparatus performs threshold value determination using a predetermined threshold value, and its determination of howling occurrence is level-dependent. Consequently, in order to perform determination in a stable fashion in a noise environment using this conventional apparatus, it is necessary to perform point-by-point threshold value adjustment in line with the acoustic environment so as to detect only howling with a high degree of accuracy.

In contrast, howling detection apparatus 100 according to this embodiment can reduce both erroneous detection and non-detection of howling without performing point-by-point adjustment of a threshold value used for howling detection. Therefore, howling detection apparatus 100 according to this embodiment can detect howling in a stable fashion even in a noise environment, and can detect the occurrence of howling with a higher degree of accuracy than in the case of conventional technology.

A value treated as information representing a range of input signal level fluctuation is not limited to the minimum input signal level value. As a variant of Embodiment 1, a description is given below of level fluctuation estimated value and threshold value calculation processing when a level fluctuation estimated value is found from a transition of a value other than the minimum input signal level value.

(Variant 1 of Embodiment 1)

Variant 1 of Embodiment 1 is an example of a case in which a level fluctuation estimated value is found from a transition of the maximum input signal level value. That is to say, this variant is an example in which a value that gradually decreases by a predetermined amount from the maximum input signal level value over time is calculated as a level fluctuation estimated value.

Figure 4:
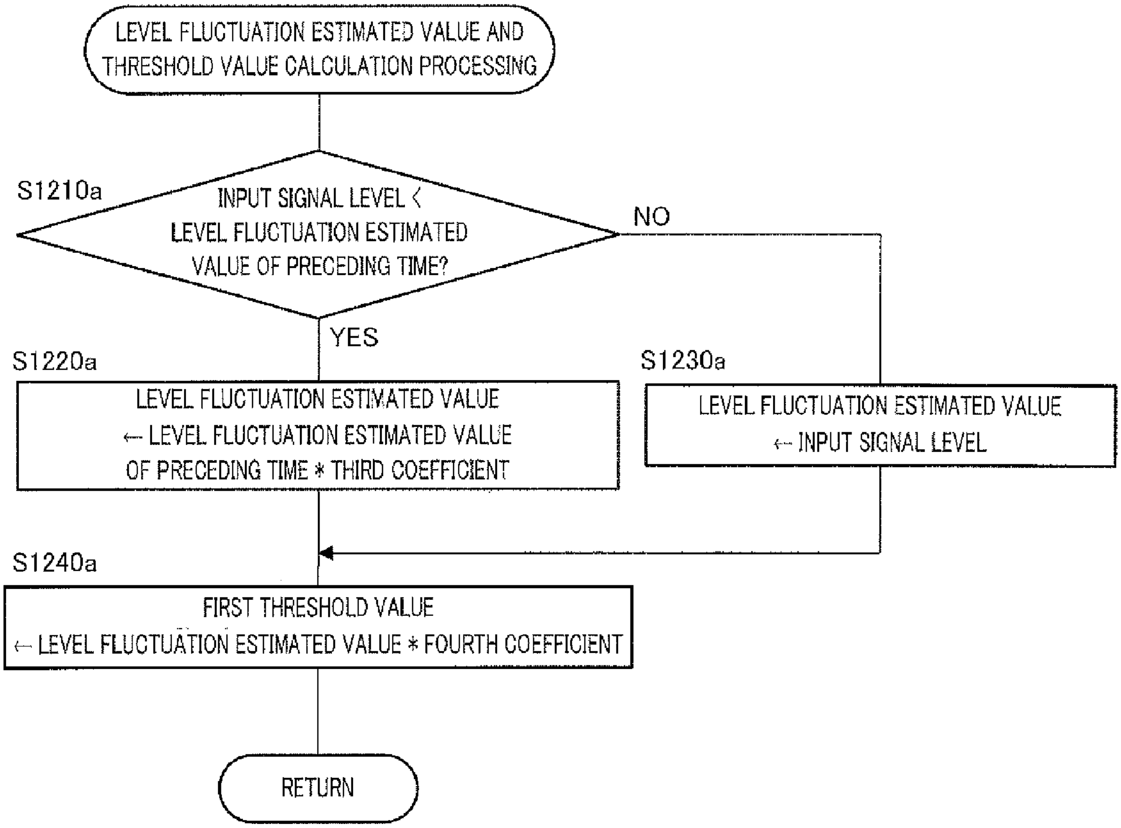
FIG. 4 is a flowchart showing an example of level fluctuation estimated value and threshold value calculation processing in Variant 1 of Embodiment 1.

FIG. 4 is a flowchart showing an example of level fluctuation estimated value and threshold value calculation processing in this variant, and corresponds to FIG. 3, When an input signal level is input (step S1100 in FIG. 2), level fluctuation estimated value calculation section 320 proceeds to step S1210*a*.

In step S1210*a*, level fluctuation estimated value calculation section 320 determines whether or not the input signal level is less than the level fluctuation estimated value. If the input signal level is less than the level fluctuation estimated value (S1210*a*: YES), level fluctuation estimated value calculation section 320 proceeds to step S1220*a*. If the input signal level is not less than the level fluctuation estimated value, or if this is the first cycle and a level fluctuation estimated value has not yet been calculated (that is, S1210*a*: NO), level fluctuation estimated value calculation section 320 proceeds to step S1230*a*.

In step S1220*a*, level fluctuation estimated value calculation section 320 updates the level fluctuation estimated value by a value obtained by multiplying the level fluctuation estimated value by a predetermined third coefficient, and returns to the processing in FIG. 2. Here, the third coefficient is a value that tracks the level fluctuation estimated value virtually in real time for a gradual decrease in the input signal level of howling, and performs delayed tracking of attenuation of the input signal level such as a fall section of train noise.

Level fluctuation estimated value calculation section 320 may also update the level fluctuation estimated value by a value obtained by subtracting a predetermined constant from the level fluctuation estimated value. In this case, the third coefficient is a value exceeding 0.

In step S1230*a*, level fluctuation estimated value calculation section 320 updates the level fluctuation estimated value by the input signal level, and proceeds to step S1240*a*.

In step S1240*a*, threshold value calculation section 330 calculates a value obtained by multiplying the updated level fluctuation estimated value by a predetermined fourth coefficient as a first threshold value, and returns to the processing in FIG. 2. Here, the fourth coefficient is a value exceeding 0 and less than 1. Furthermore, the fourth coefficient is a value such that the input signal level does not become greater than or equal to the first threshold value at least immediately after a howling interval in tracking of an input signal level transition of the level fluctuation estimated value determined by the third coefficient.

Also, the second threshold value used in step S1700 is a value enabling a distinction to be made between howling and noise by tracking an input signal level transition of the first threshold value as determined by the first coefficient and third coefficient.

In this way, howling detection apparatus 100 can calculate a first threshold value such as to perform delayed tracking of an input signal level transition based on the maximum input signal level value.

In particular, howling detection apparatus 100 calculates a first threshold value such as to perform delayed tracking of a decrease in the input signal level. By this means, howling detection apparatus 100 can prevent erroneous detection of the occurrence of howling in gradual attenuation of the input signal level such as in a fall section of train noise. That is to say, howling detection apparatus 100 can sequentially calculate detection threshold values according to input signal level envelope information (magnitude and temporal transition) from continuation at the level at which howling occurred.

By this means, howling detection apparatus 100 can reduce both erroneous detection and non-detection of howling without performing point-by-point adjustment of a threshold value used for howling detection.

(Variant 2 of Embodiment 1)

Variant 2 of Embodiment 1 is an example of a case in which a transition of the long-term average value of an input signal level is treated as an input signal level transition. That is to say, this variant is an example in which a value that gradually increases or gradually decreases by a predetermined amount from an average input signal level value over time is calculated as a level fluctuation estimated value.

Figure 5:
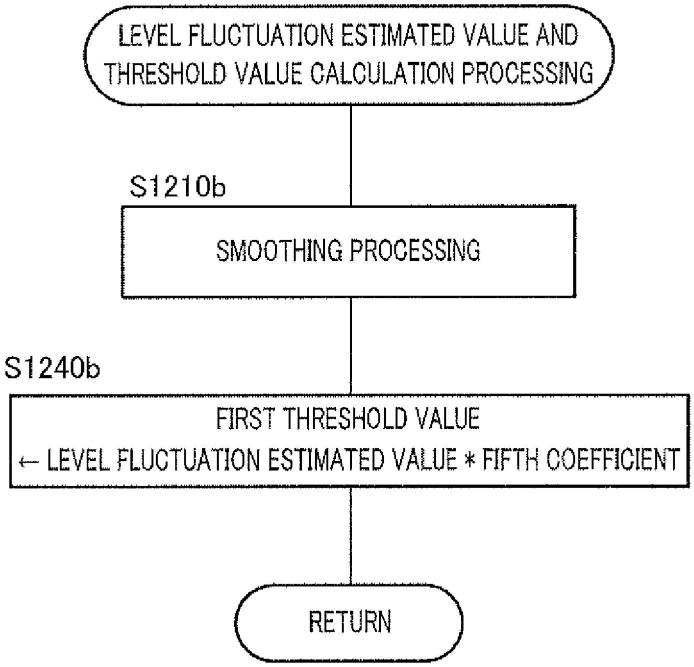
FIG. 5 is a flowchart showing an example of level fluctuation estimated value and threshold value calculation processing in Variant 2 of Embodiment 1.

FIG. 5 is a flowchart showing an example of level fluctuation estimated value and threshold value calculation processing in this variant, and corresponds to FIG. 3.

When an input signal level is input (step S1100 in FIG. 2), level fluctuation estimated value calculation section 320 proceeds to step S1210*b*.

In step S1210*b*, level fluctuation estimated value calculation section 320 performs smoothing processing on time series data of the input signal level. Then level fluctuation estimated value calculation section 320 updates the level fluctuation estimated value by a value obtained by the smoothing processing. The value obtained by the smoothing processing is a long-term average value of the input signal level. If sufficient cycles have not yet elapsed for a long-term average value to be calculated, level fluctuation estimated value calculation section 320 may set a predetermined initial value as the level fluctuation estimated value.

Level fluctuation estimated value N(k) for current cycle k after smoothing can be found, for example, by performing the moving average calculation shown in equation 1 below.

[1]

$$N(k)=(1-\alpha)\times X(k)+\alpha\times N(k-1) \quad \text{(Equation 1)}$$

Here, X(k) is the input signal level in current cycle k, N(k−1) is the level fluctuation estimated value for preceding cycle k−1, and α is a value of an order enabling the average input signal level value to be traced, being a forgetting factor that satisfies the relationship 0<<α<1. More specifically, α is a value that tracks the level fluctuation estimated value virtually in real time for an input signal level change of a gradual update amount such as in the case of the noise of a train. That is to say, α is a value such as to perform delayed tracking of an input signal level change by an abrupt update amount of howling.

Then, in step S1240*b*, threshold value calculation section 330 calculates a value obtained by multiplying the updated level fluctuation estimated value by a predetermined fifth coefficient as a first threshold value, and returns to the processing in FIG. 2.

Here, the fifth coefficient is a value such that the input signal level does not become less than or equal to the first threshold value at least at the beginning of a howling interval in tracking an input signal level transition of the level fluctuation estimated value as determined by forgetting function α. The fifth coefficient is, for example, 1, in which case threshold value calculation section 330 uses the level fluctuation estimated value directly as the first coefficient.

Threshold value calculation section 330 may also use, as the first threshold, a value obtained by multiplying the level fluctuation estimated value by a value greater than or equal to 1 as the fifth coefficient, or a value obtained by adding a predetermined constant greater than or equal to 0 to the level fluctuation estimated value, as the first threshold value.

In this way, howling detection apparatus 100 can calculate a first threshold value such as to perform delayed tracking of an input signal level transition based on a long-term average value of the input signal level.

(Variant 3 of Embodiment 1)

Variant 3 of Embodiment 1 is an example of a case in which a level fluctuation estimated value is tracked virtually in real time for a rise of the input signal level at the start of noise.

Figure 6:
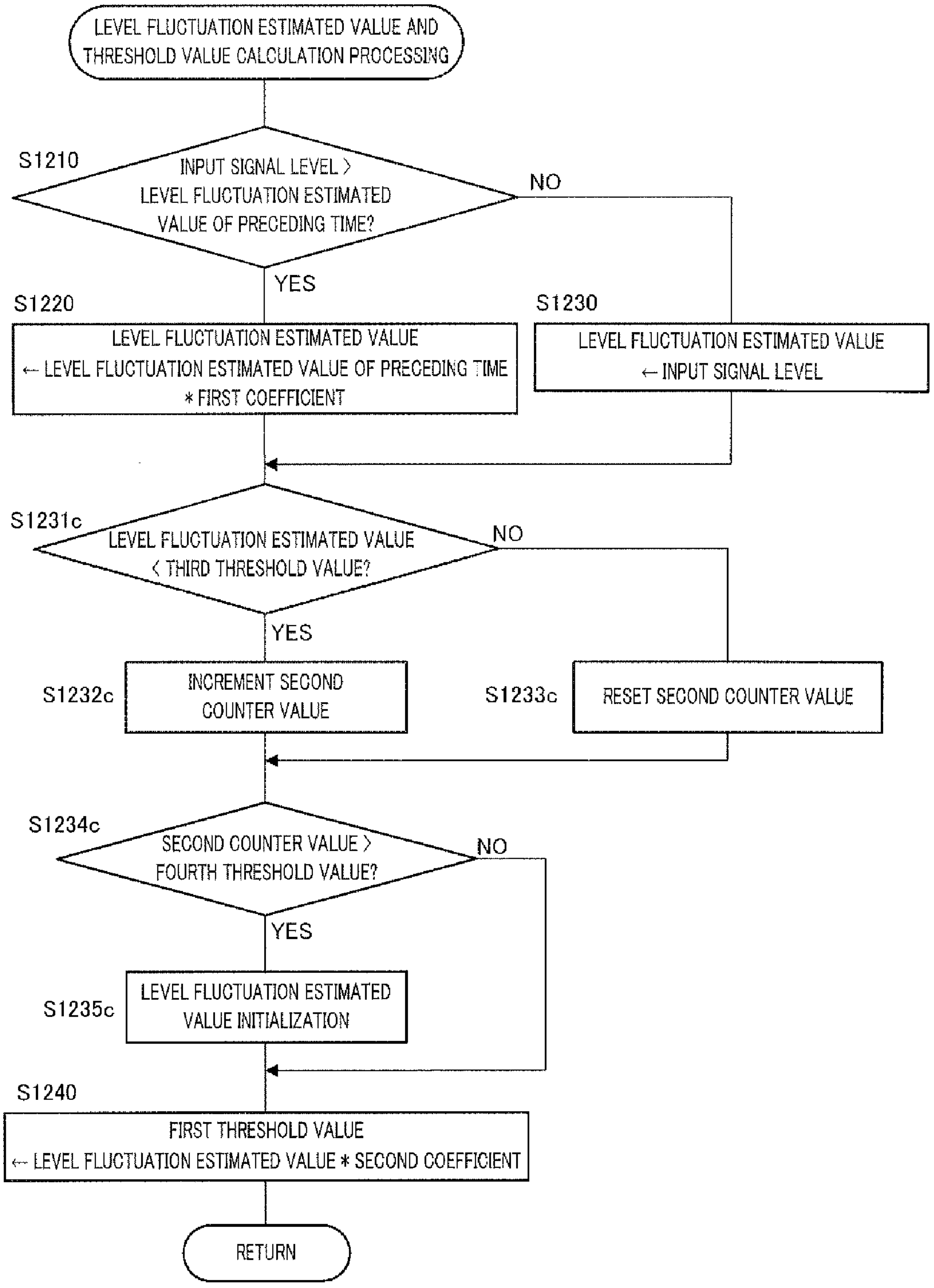
FIG. 6 is a flowchart showing an example of level fluctuation estimated value and threshold value calculation processing in Variant 3 of Embodiment 1.

FIG. 6 is a flowchart showing an example of level fluctuation estimated value and threshold value calculation processing in this variant, and corresponds to FIG. 3.

After updating the level fluctuation estimated value (steps S1210 through S1230), howling detection apparatus 100 proceeds to step S1231*c*.

In step S1231*c*, when inputting a signal level (step S1100 in FIG. 2), level fluctuation estimated value calculation section 320 determines whether or not the level fluctuation estimated value is less than a predetermined third threshold value.

Here, the third threshold value is a value greater than or equal to 0, and is, for example, a value equivalent to the noise level in a quiet acoustic environment.

If the level fluctuation estimated value is less than the third threshold value (S1231*c*: YES), level fluctuation estimated value calculation section 320 proceeds to step S1232*c*. If the level fluctuation estimated value is not less than the third threshold value, or if this is the first cycle and a level fluctuation estimated value has not yet been calculated, (S1231*c*: NO), level fluctuation estimated value calculation section 320 proceeds to step S1233*c*.

In step S1232*c*, level fluctuation estimated value calculation section 320 increments a second counter value and proceeds to step S1234*c*.

In step S1233*c*, level fluctuation estimated value calculation section 320 resets the second counter value and proceeds to step S1234*c*.

That is to say, the second counter value is a value indicating the duration of a state in which the level fluctuation estimated value does not exceed the third threshold value.

Then, in step S1234*c*, level fluctuation estimated value calculation section 320 determines whether or not the second counter value exceeds a predetermined fourth threshold value.

Here, the fourth threshold value is, for example, a value equivalent to 0.1 second to 0.5 second, and is a value set in order to determine whether a substantially silent state is continuing in which the noise level is low and there is no input signal to the microphone.

If the second counter value exceeds the fourth threshold value (S1234*c*: YES), level fluctuation estimated value calculation section 320 proceeds to step S1235*c*. If the second counter value does not exceed the fourth threshold value (S1234*c*: NO), level fluctuation estimated value calculation section 320 proceeds directly to step S1240, and thereby returns to the processing in FIG. 2.

In step S1235*c*, level fluctuation estimated value calculation section 320 initializes the level fluctuation estimated value—that is, makes the level fluctuation estimated value the same as the input signal level—and then proceeds to step S1240 and returns to the processing in FIG. 2.

That is to say, when a state in which the level fluctuation estimated value does not exceed the third threshold value continues in excess of a predetermined time threshold value, a state is established in which the input signal level is tracked for a predetermined time. This is because, when the input signal level changes abruptly from a low state to a high state, there is a possibility of howling being erroneously determined to have occurred if the level fluctuation estimated value that is the basis of the first threshold value does not track this.

By means of this kind of level fluctuation estimated value and threshold value calculation processing, howling detection apparatus 100 can track the level fluctuation estimated value virtually in real time at a rise of the input signal level, and then perform delayed tracking.

By this means, howling detection apparatus 100 can prevent noise for which the input signal level increases abruptly at the start, as in the case of a telephone ringtone, from being erroneously detected as howling, while allowing howling to be detected. Therefore, howling detection apparatus 100 can further improve the accuracy of howling detection.

The ability of howling detection apparatus 100 according to Variant 3 to detect the occurrence of howling with a high degree of accuracy will now be explained.

Here, a first input signal in which howling is included, a second input signal in which a telephone ringtone is included, and a third input signal in which the sound of a wind chime is included, are assumed.

Figures 7A, 7B, 7C, 7D:
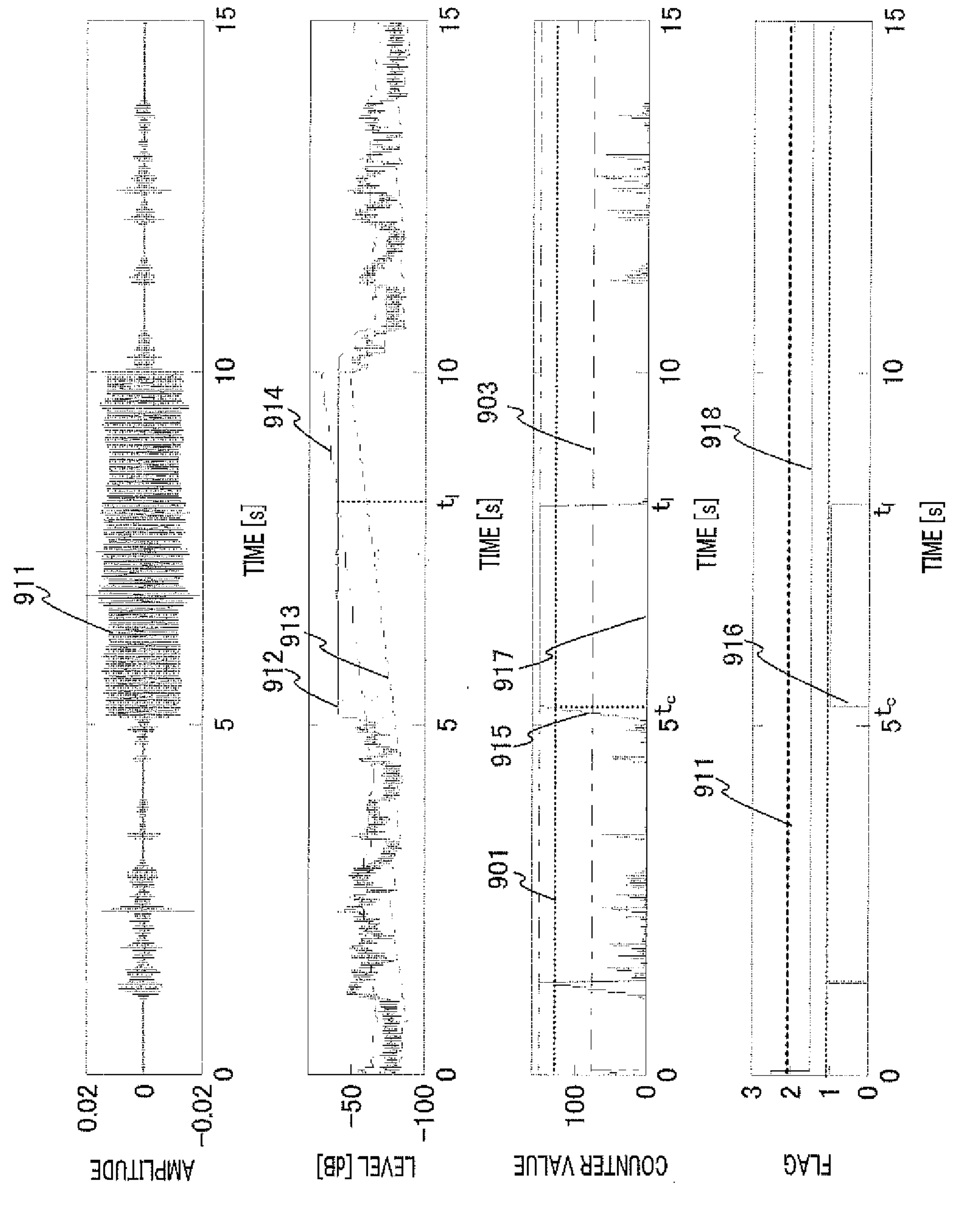
FIG. 7 is a drawing showing examples of the states of signals corresponding to howling in Variant 3 of Embodiment 1.

FIG. 7 is a drawing showing examples of the states of signals in the case of a first input signal in which howling is included. FIG. 7A shows temporal transitions of the input signal. FIG. 7B shows temporal transitions of the input signal level, the level fluctuation estimated value, and the first threshold value. FIG. 7C shows temporal transitions of the first counter value. FIG. 7D shows temporal transitions of the detection flag and an initialization flag. Here, the initialization flag is for indicating whether or not there is a state in which the level fluctuation estimated value is to be initialized.

In first input signal 911, the interval from the fifth second to the tenth second is a howling interval. As shown in FIG. 7A, the amplitude of first input signal 911 is large in the howling interval. Therefore, as shown in FIG. 7B, input signal level 912 maintains a high-level state in the howling interval (S1210: YES).

Also, as shown in FIG. 7B, in the howling interval, level fluctuation estimated value 913 gradually increases (S1220) and first threshold value 914 also gradually increases (S1240).

In the interval up to time $t_1$ at which first threshold value 914 reaches input signal level 912, input signal level 912 is continuously determined to exceed first threshold value 914 (S1400: YES). As a result, first counter value 915 gradually increases (S1500).

Then, as shown in FIG. 7C, when first counter value 915 exceeds second threshold value 901 at time $t_c$ before time $t_1$ (S1700: YES), detection flag 916 is turned on (S1800) as shown in FIG. 7D. Also, when time $t_1$ at which first threshold value 914 reaches input signal level 912 is passed (S1400: NO), first counter value 915 is reset and becomes less than or equal to second threshold value 901 (S1600, 1700: NO).

As a result, detection flag 916 is turned off (S1900) as shown in FIG. 7D.

In this example, it is assumed that level fluctuation estimated value 913 does not become continuously less than the third threshold value (S1231*c*: NO). In this case, as shown in FIG. 7C, second counter value 917 does not increase (S1231*c*) and does not exceed fourth threshold value 903 (S1234*c*: NO).

As a result, initialization flag 918 remains in the off state as shown in FIG. 7D.

FIG. 8 is a drawing showing examples of the states of signals in the case of a second input signal in which a telephone ringtone is included but howling is not included, and corresponds to FIG. 7.

In second input signal 921, the interval from time $t_1$ to time $t_2$ is an interval in which a telephone ringtone sounds (hereinafter referred to as "a ringtone interval").

Figures 8A, 8B, 8C, 8D:
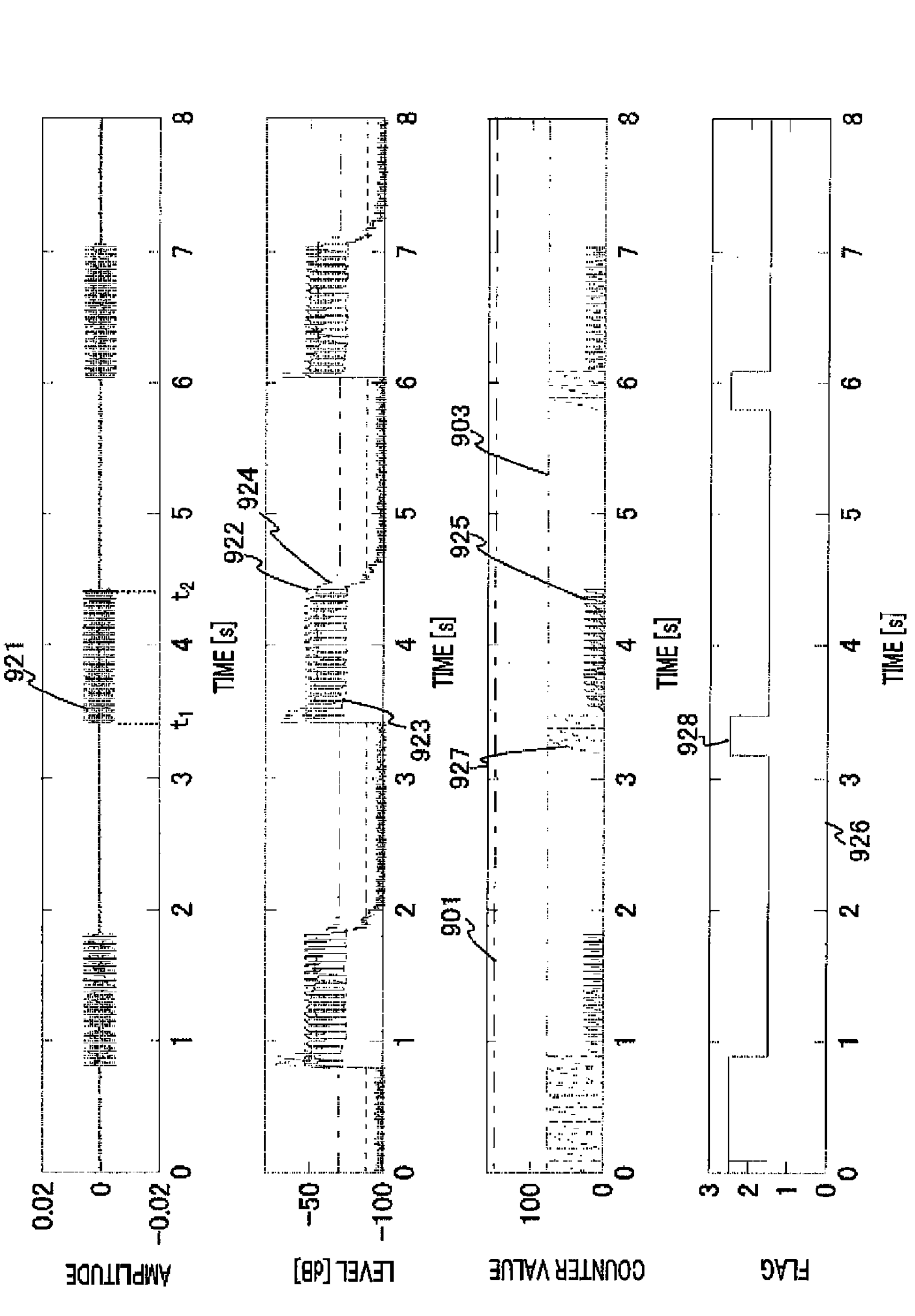
FIG. 8 is a drawing showing examples of the states of signals corresponding to a ringtone in Variant 3 of Embodiment 1.

As shown in FIG. 8A, since a telephone ringtone is not a continuous sound, the amplitude of second input signal 921 repeatedly alternates between a large state and a small state in short cycles in a ringtone interval. Therefore, as shown in FIG. 8B, in a ringtone interval, determination that input signal level 922 exceeds first threshold value 924 and determination that input signal level 922 does not exceed first threshold value 924 repeatedly alternate in short cycles (S1400: NO).

As a result, as shown in FIG. 8C, first counter value 925 does not increase (S1600) and does not exceed second threshold value 901 (S1700: NO).

However, in an interval until level fluctuation estimated value 923 tracks a rise of input signal level 922 accompanying a rise of second input signal 921 at time $t_1$, input signal level 922 enters a state that exceeds level fluctuation estimated value 923. Therefore, if level fluctuation estimated value 923 tracking of a rise of input signal level 922 is delayed, there is a risk of erroneous detection as an occurrence of howling.

Thus, by means of the above-described initialization, initialization flag 928 goes to the on state until time $t_1$ of a rise of input signal level 922 as shown in FIG. 8D. That is to say, level fluctuation estimated value 923 and first threshold value 924 rapidly track a rise of input signal level 922 as shown in FIG. 8B.

Following this, initialization flag 928 goes to the off state since a state in which level fluctuation estimated value 923 is less than the third threshold value does not continue. That is to say, level fluctuation estimated value 923 performs delayed tracking of the abrupt increase in the input signal level.

Therefore, as shown in FIG. 8D, detection flag 926 is always turned off (S1900), including at the time of a rise of second input signal 921.

Thus, a noise for which the input signal level increases intermittently, as in the case of a telephone ringtone, is not erroneously detected as howling by howling detection apparatus 100 according to this embodiment.

FIG. 9 is a drawing showing examples of the states of signals in the case of a third input signal in which the sound of a wind chime is included but howling is not included, and corresponds to FIG. 7.

Figures 9A, 9B, 9C, 9D:
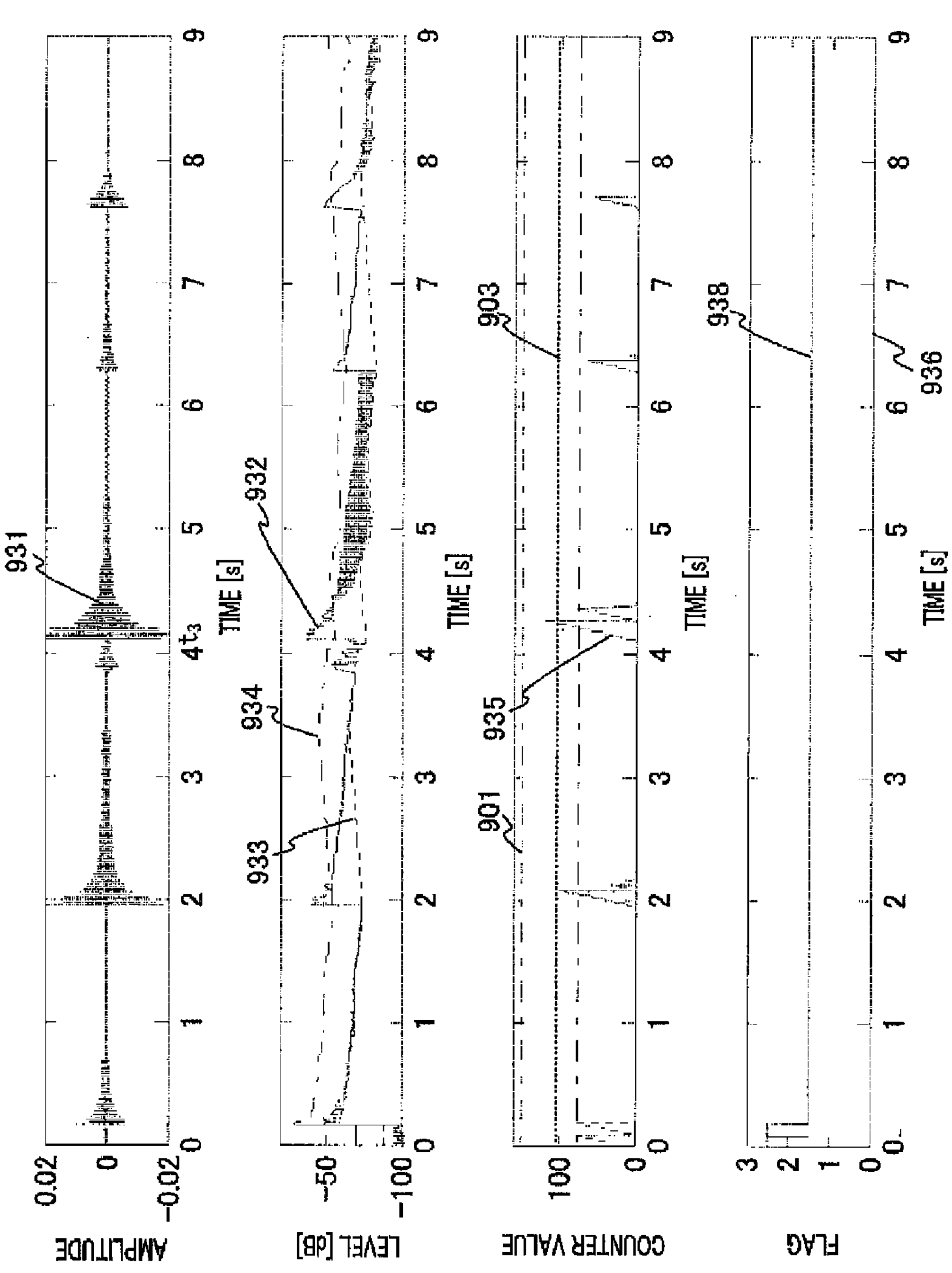
FIG. 9 is a drawing showing examples of the states of signals corresponding to a wind chime in Variant 3 of Embodiment 1.

It is assumed that an interval in which a wind chime sounds is continuous in third input signal 931. As shown in FIG. 9A, the amplitude of third input signal 931 is large at time $t_3$ when the sound of the wind chime begins, but rapidly attenuates, and, as shown in FIG. 9B, input signal level 932 also makes a transition to a low state within a short time (S1210: NO).

That is to say, as shown in FIG. 9B, even if level fluctuation estimated value 933 exceeds first threshold value 934 calculated based on level fluctuation estimated value 933 (S1400: YES) immediately after time $t_3$, it immediately becomes less than or equal to first threshold value 934 (S1400: NO). Therefore, as shown in FIG. 9C, even if first counter value 935 increases (S1500) immediately after time $t_3$, it is immediately reset (S1600).

As a result, first counter value 935 does not reach second threshold value 901 (S1700: NO), and detection flag 936 remains in the off state as shown in FIG. 9D.

In this example, it is assumed that level fluctuation estimated value 933 does not become continuously less than the third threshold value (S1231*c*: NO). In this case, as shown in FIG. 9C, second counter value 937 does not increase (S1233*c*) and does not exceed fourth threshold value 903 (S1234*c*: NO). As a result, initialization flag 938 remains in the off state as shown in FIG. 9D.

Thus, a noise for which the input signal level rapidly attenuates, as in the case of the sound of a wind chime, is not erroneously detected as howling by howling detection apparatus 100 according to this embodiment.

(Embodiment 2)

Embodiment 2 of the present invention is a howling detection apparatus in which the accuracy of howling detection is improved using a frequency peak of an input signal.

Figure 10:
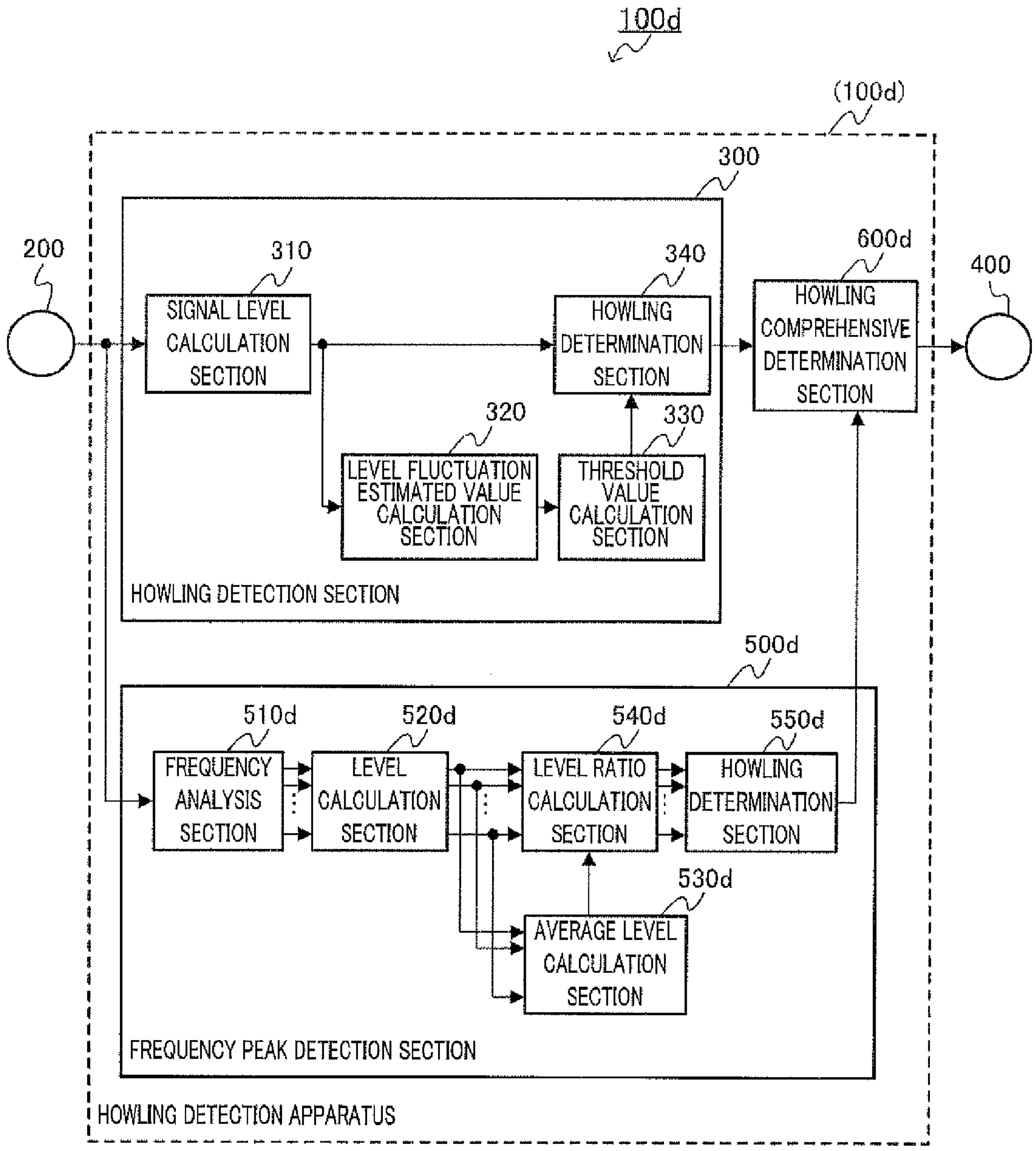
FIG. 10 is a block diagram showing an example of the configuration of a howling detection apparatus according to Embodiment 2 of the present invention.

FIG. 10 is a block diagram showing an example of the configuration of a howling detection apparatus according to this embodiment, and corresponds to FIG. 1 of Embodiment 1. Parts in FIG. 10 identical to those in FIG. 1 are assigned the same reference signs as in FIG. 1, and descriptions thereof are omitted here.

In FIG. 10, howling detection apparatus 100*d* according to this embodiment includes input terminal 200, howling detection section 300 of Embodiment 1, frequency peak detection section 500*d*, howling comprehensive determination section 600*d*, and output terminal 400.

In this embodiment, input terminal 200 outputs an input signal not only to howling detection section 300 but also to frequency peak detection section 500*d*. Also, howling detection section 300 outputs a howling determination result not to output terminal 400 but to howling comprehensive determination section 600*d* as a first determination result.

Frequency peak detection section 500*d* determines whether or not howling has occurred in an input signal based on the presence or absence of a frequency peak in the input signal. Frequency peak detection section 500*d* includes frequency analysis section 510*d*, level calculation section 520*d*, average level calculation section 530*d*, level ratio calculation section 540*d*, and howling determination section 550*d*

Frequency analysis section 510*d* converts or divides an input signal into frequency components for each of a plurality of band divisions into which the frequency band is divided, and outputs frequency components of each band division (hereinafter referred to simply as "frequency components") to level calculation section 520*d*.

Various known methods of converting or dividing a temporal signal into a plurality of frequency components can be used as the method of conversion or division of an input signal into frequency components. Known methods include, for example, a fast Fourier transform, a filter bank composed of a plurality of FIR (finite impulse response) or IIR (infinite impulse response) filters, or the like.

Level calculation section 520*d* calculates a per-unit-time power value or absolute value for each converted or divided frequency component. Level calculation section 520*d* outputs calculated, on a per-frequency-component basis, input signal levels to average level calculation section 530*d* and level ratio calculation section 540*d*.

Average level calculation section 530*d* calculates an average value of the input levels of the plurality of frequency components, and outputs the calculated average value to level ratio calculation section 540*d* as an average level.

Level ratio calculation section 540*d* calculates a ratio with respect to the average value (hereinafter referred to as "level ratio") for each input signal level of the plurality of frequency components, and outputs the calculated per-frequency-component level ratios to howling determination section 550*d*.

Howling determination section 550*d* determines whether or not howling has occurred in the input signal based on the level ratio of each frequency component, and outputs a second determination result to howling comprehensive determination section 600*d* as a howling detection result.

By accepting input that indicates both the first determination result and second determination result conclude that howling has occurred as a condition, howling comprehensive determination section 600*d* outputs a final determination result indicating that howling has occurred.

Howling detection apparatus 100*d* of this kind can improve the accuracy of howling detection since it uses a result combining a determination result from howling detection section 300 and a determination result from frequency peak detection section 500*d* as a final determination result.

Howling detection apparatus 100*d* may also have a configuration in which input terminal 200 and output terminal 400 are omitted.

The operation of howling detection apparatus 100*d* will now be described.

Figure 11:
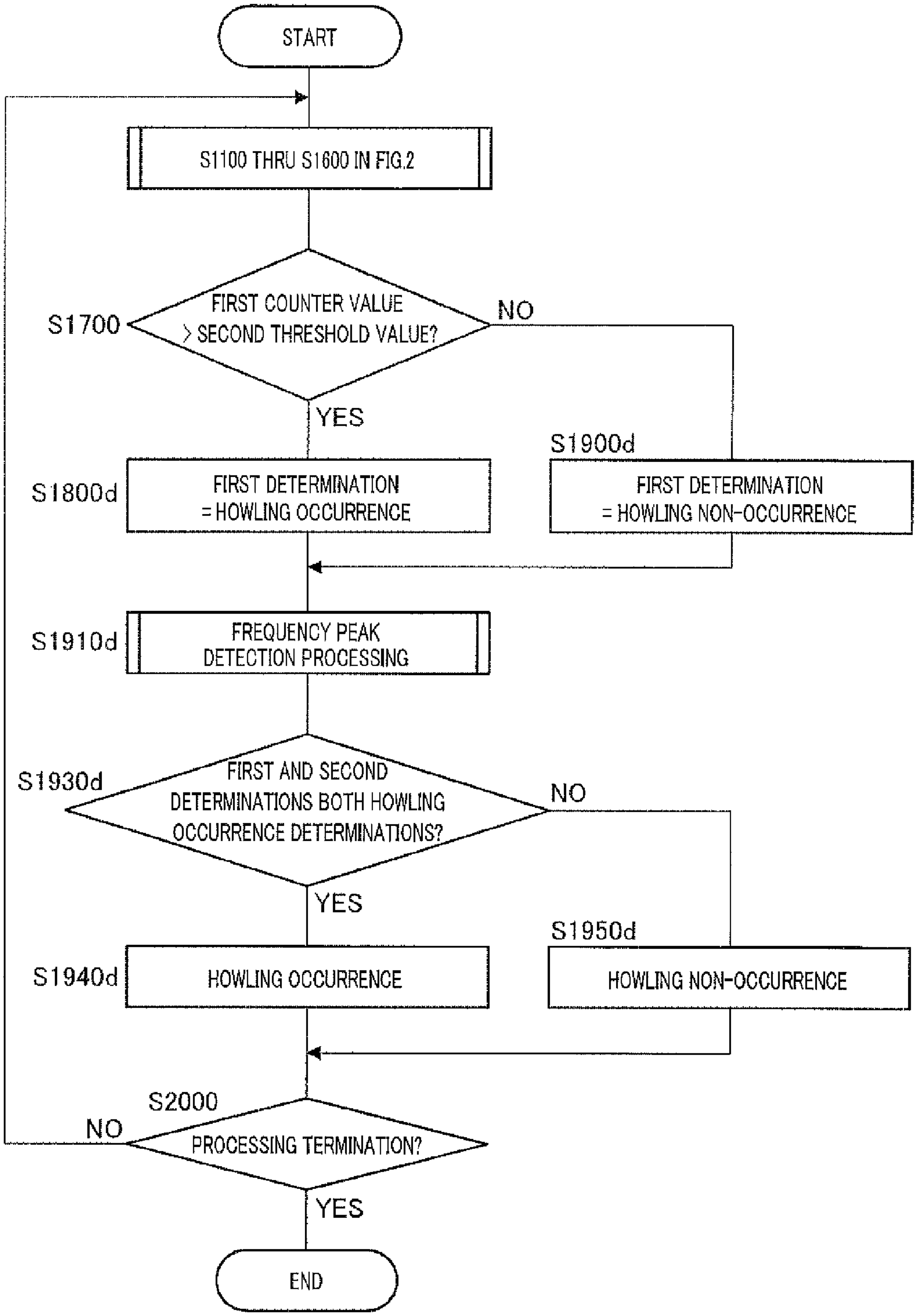
FIG. 11 is a flowchart showing an example of the operation of the howling detection apparatus according to Embodiment 2.

FIG. 11 is a flowchart showing an example of the operation of howling detection apparatus 100*d*, and corresponds to FIG. 2 of Embodiment 1. Parts in FIG. 11 identical to those in FIG. 2 are assigned the same step numbers as in FIG. 2, and descriptions thereof are omitted here.

If the first counter value exceeds the second threshold value (S1700: YES), howling determination section 340 of howling detection section 300 proceeds to step S1800*d*. Then, in step S1800*d*, howling determination section 340 outputs a first determination result indicating that howling has occurred to howling comprehensive determination section 600*d*.

If the first counter value does not exceed the second threshold value (S1700: NO), howling determination section 340 of howling detection section 300 proceeds to step S1900*d*. Then, in step S1900*d*, howling determination section 340 outputs a first determination result indicating that howling has not occurred to howling comprehensive determination section 600*d*.

Then, in step S1910*d*, frequency peak detection section 500*d* performs frequency peak detection processing. Frequency peak detection processing is processing that determines whether or not howling has occurred in an input signal based on the presence or absence of a frequency peak in the input signal.

Frequency peak detection section 500*d* may also perform frequency peak detection processing before, or at the same time as, the processing up to the first determination by howling detection section 300 (S1100 through S1900*d*). In this case also, frequency peak detection section 500*d* performs frequency peak detection processing in the same cycle as the howling detection section 300 determination cycle, that is, every sample or every frame (plurality of samples).

Figure 12:
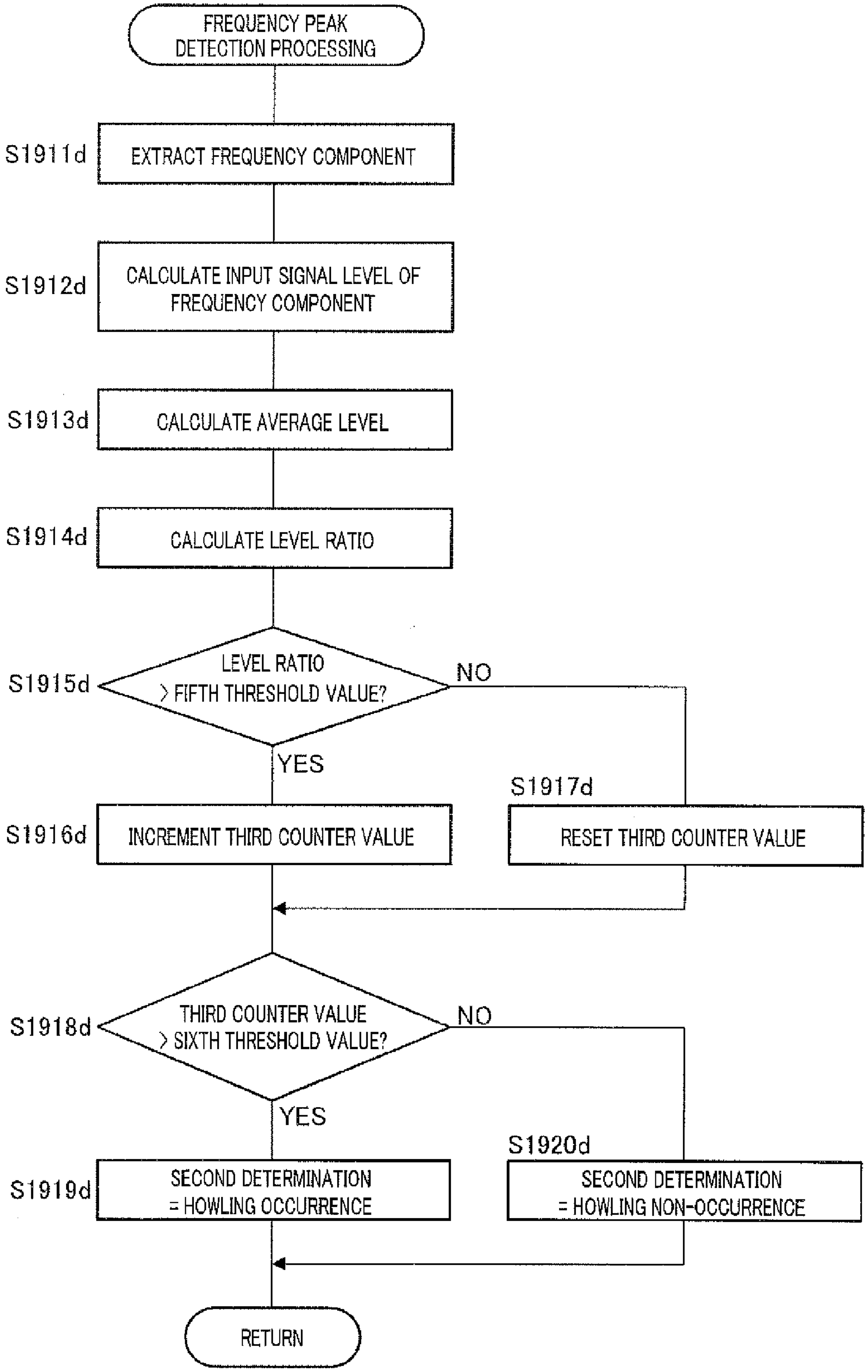
FIG. 12 is a flowchart showing an example of frequency peak detection processing in Embodiment 2.

FIG. 12 is a flowchart showing an example of frequency peak detection processing.

First, in step S1911*d*, frequency analysis section 510*d* extracts a frequency component for each of a plurality of band divisions from the input signal.

Then, in step S1912*d*, level calculation section 520*d* calculates the input signal level of each frequency component from the plurality of frequency components.

Then, in step S1913*d*, average level calculation section 530*d* calculates an average level from the input signal levels of the plurality of frequency components. At this time, average level calculation section 530*d* may weigh the plurality of frequency component input signal levels in calculating the average level.

Then, in step S1914*d*, level ratio calculation section 540*d* calculates a level ratio for each frequency component from the plurality of frequency component input signal levels and the average level.

Then, in step S1915*d*, howling determination section 550*d* determines for each frequency component whether or not its level ratio exceeds a predetermined fifth threshold value.

Here, the value set as the fifth threshold value is a value making it possible to determine that the above level ratio stands out in comparison with other frequency components.

Howling determination section 550*d* proceeds to step S1916*d* for a frequency component for which the level ratio exceeds the fifth threshold value, or proceeds to step S1917*d* for a frequency component for which the level ratio does not exceed the fifth threshold value.

In step S1916*d*, howling determination section 550*d* increments a relevant third counter value among third counter values prepared for each frequency component, and proceeds to step S1918*d*.

In step S1917*d*, howling determination section 550*d* resets the relevant third counter value and proceeds to step S1918*d*.

That is to say, a third counter value indicates the length of time for which peaks occur continuously in the corresponding frequency component.

In step S1918*d*, howling determination section 550*d* determines whether or not the third counter value of any frequency component exceeds a predetermined sixth threshold value.

Here, the sixth threshold value is a value equivalent to a predetermined time shorter than a howling interval and longer than the duration of a noise state, and is a value equivalent to 0.5 second to 1 second, for example.

If the third counter value exceeds the sixth threshold value (S1918*d*: YES), howling determination section 550*d* proceeds to step S1919*d*. If the third counter value does not exceed the sixth threshold value (S1918*d*: NO), howling determination section 550*d* proceeds to step S1920*d*.

In step S1919*d*, howling determination section 550*d* outputs a second determination result indicating that howling has occurred to howling comprehensive determination section 600*d*, and returns to the processing in FIG. 11.

In step S1920*d*, howling determination section 550*d* outputs a second determination result indicating that howling has not occurred to howling comprehensive determination section 600*d*, and returns to the processing in FIG. 11.

In step S1930*d* in FIG. 11, howling comprehensive determination section 600*d* inputs the first determination result from howling detection section 300 and the second determination result from frequency peak detection section 500*d*. Then howling comprehensive determination section 600*d* performs comprehensive determination of whether or not howling has occurred based on the first determination result and second determination result.

If both the first determination result and the second determination result show a determination result indicating that howling has occurred (S1930*d*: YES), howling comprehensive determination section 600*d* proceeds to step S1940*d*. If at least one of the first determination result and the second determination result does not show a determination result indicating that howling has occurred (S1930*d*: NO), howling comprehensive determination section 600*d* proceeds to step S1950*d*.

In step S1940*d*, howling comprehensive determination section 600*d* makes a comprehensive determination that howling has occurred, outputs a determination result indicating this to output terminal 400, and proceeds to step S2000.

In step S1950*d*, howling comprehensive determination section 600*d* makes a comprehensive determination that howling has not occurred, and proceeds directly to step S2000.

By means of such processing, howling detection apparatus 100*d* can output a result combining a determination result from howling detection section 300 and a determination result from frequency peak detection section 500*d* as a final determination result.

By performing howling detection using not only a threshold value in accordance with a noise level but also a frequency peak in this way, howling detection apparatus 100*d* according to this embodiment can reduce erroneous detection of howling.

A provision may also be made for howling determination section 550*d* to acquire peak frequency information indicating which frequency band a frequency peak occurs in, that is, a frequency band for which the third counter value exceeds the sixth threshold value. In this case, it is possible for howling detection apparatus 100*d* to detect which frequency band howling occurs in.

Howling comprehensive determination section 600*d* may also measure the duration of a state in which both the first determination result and the second determination result indicate the occurrence of howling. Then howling comprehensive determination section 600*d* may determine that howling has occurred on the condition that this duration exceeds a predetermined seventh threshold value.

Also, howling comprehensive determination section 600*d* may determine that howling has occurred on the condition that the difference between the time for which the first determination result indicates the occurrence of howling and the time for which the second determination result indicates the occurrence of howling is within a predetermined range. By performing such determination, howling comprehensive determination section 600*d* can further improve the accuracy of howling detection.

(Embodiment 3)

Embodiment 3 of the present invention is an example of a howling suppression apparatus that performs howling suppression using a howling detection apparatus according to Embodiment 1.

Figure 13:
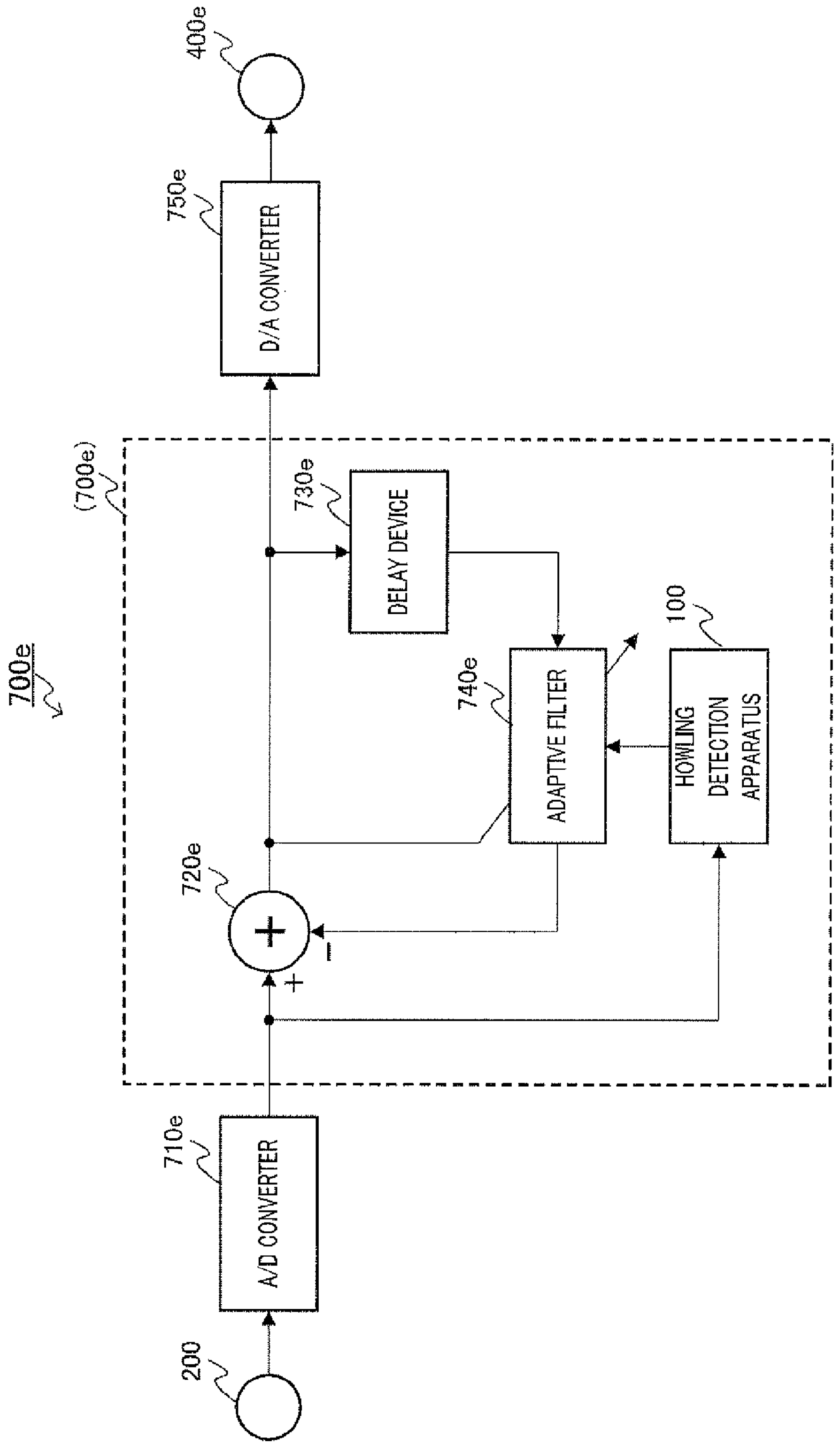
FIG. 13 is a block diagram showing the configuration of a howling suppression apparatus according to Embodiment 3 of the present invention.

FIG. 13 is a block diagram showing the configuration of a howling suppression apparatus according to this embodiment, and corresponds to FIG. 1 of Embodiment 1. Parts in FIG. 13 identical to those in FIG. 1 are assigned the same reference signs as in FIG. 1, and descriptions thereof are omitted here.

As shown in FIG. 13, howling suppression apparatus 700*e* according to this embodiment includes input terminal 200, A/D converter 710*e*, howling detection apparatus 100 according to Embodiment 1, subtracter 720*e*, delay device 730*e*, adaptive filter 740*e*, D/A converter 750*e*, and output terminal 400*e*.

Input terminal 200 outputs an input signal to A/D converter 710*e*.

A/D converter 710*e* performs A/D conversion of the input signal from an analog signal to a digital signal, and outputs the converted input signal to howling detection apparatus 100 and subtracter 720*e*.

Howling detection apparatus 100 performs howling detection from the input signal, and outputs the detection result not to output terminal 400*e* but to adaptive filter 740*e*.

Subtracter 720*e* calculates the difference between the input signal input from A/D converter 710*e* and a filter output signal input from adaptive filter 740*e* described later herein. Then subtracter 720*e* outputs the calculated difference to delay device 730*e*, adaptive filter 740*e*, and D/A converter 750*e*. That is to say, the input signal is a target signal, and the difference is an error signal.

Delay device 730*e* generates a signal resulting from delaying the error signal, and outputs the generated signal to adaptive filter 740*e* as a reference signal of adaptive filter 740*e* described later herein. Here, the delay amount of delay device 730*e* is assumed to be set to a value such that target signal (input signal) of subtracter 720*e* and the reference signal (filter input signal) control signal cease to have a mutual correlation.

Adaptive filter 740*e* sequentially updates the filter coefficient so that the mean square value of the error signal becomes minimal. Then adaptive filter 740*e* performs convolution of the reference signal and the filter coefficient, and outputs the signal subtracter 720*e* as a filter output signal.

When adaptive filter 740*e* outputs a signal that simulates a feedback signal looping from the speaker to the microphone, the mean square value of the error signal becomes minimal. Therefore, the above filter coefficient updating by adaptive filter 740*e* means performing estimation of the transfer characteristics of an acoustic feedback path between the speaker and the microphone.

In this embodiment, the result of such filter updating is that an adaptive filter 740*e* output signal simulating a feedback signal is deducted from a target signal including a feedback signal, and howling is suppressed. Various kinds of known algorithms, such as an NLMS (normalized least mean square) algorithm, can be used as a filter coefficient update algorithm.

Adaptive filter 740*e* enters a howling suppression mode on the condition that a howling detection result from howling detection apparatus 100 shows a determination result indicating that howling has occurred.

Here, a howling suppression mode is a mode in which filter coefficient updating is performed, or the speed of filter coefficient updating is increased. Therefore, adaptive filter 740*e* can update a filter coefficient at high speed until howling converges only when howling occurs.

D/A converter 750*e* performs D/A conversion of an error signal from a digital signal to an analog signal, and outputs the converted signal to output terminal 400*e*.

Output terminal 400*e* is a terminal for connection to an acoustic apparatus such as an amplifier having a function of outputting speech from a speaker.

Howling suppression apparatus 700*e* can be configured, for example, by means of a computer that includes a CPU, a storage medium such as RAM, and so forth. Also, howling suppression apparatus 700*e* may have a configuration in which input terminal 200, A/D converter 710*e*, D/A converter 750*e*, and output terminal 400*e* are omitted.

Thus, howling suppression apparatus 700*e* according to this embodiment can suppress howling by canceling a feedback signal looping from a speaker to a microphone using an adaptive filter.

Also, howling suppression apparatus 700*e* automatically calculates a threshold value for howling detection according to the acoustic environment in which it is used, and controls the on/off state or filter coefficient updating speed of the adaptive filter according to the detection result. By this means, howling suppression apparatus 700*e* can perform howling suppression while avoiding a volume change and sound quality change as far as possible when howling does not occur.

Howling suppression apparatus 700*e* may also have a configuration in which howling detection apparatus 100*d* according to Embodiment 2 is provided instead of howling detection apparatus 100 according to Embodiment 1.

(Embodiment 4)

Embodiment 4 of the present invention is an example of howling suppression apparatus that performs howling suppression by locally reducing frequency band gain.

Figure 14:
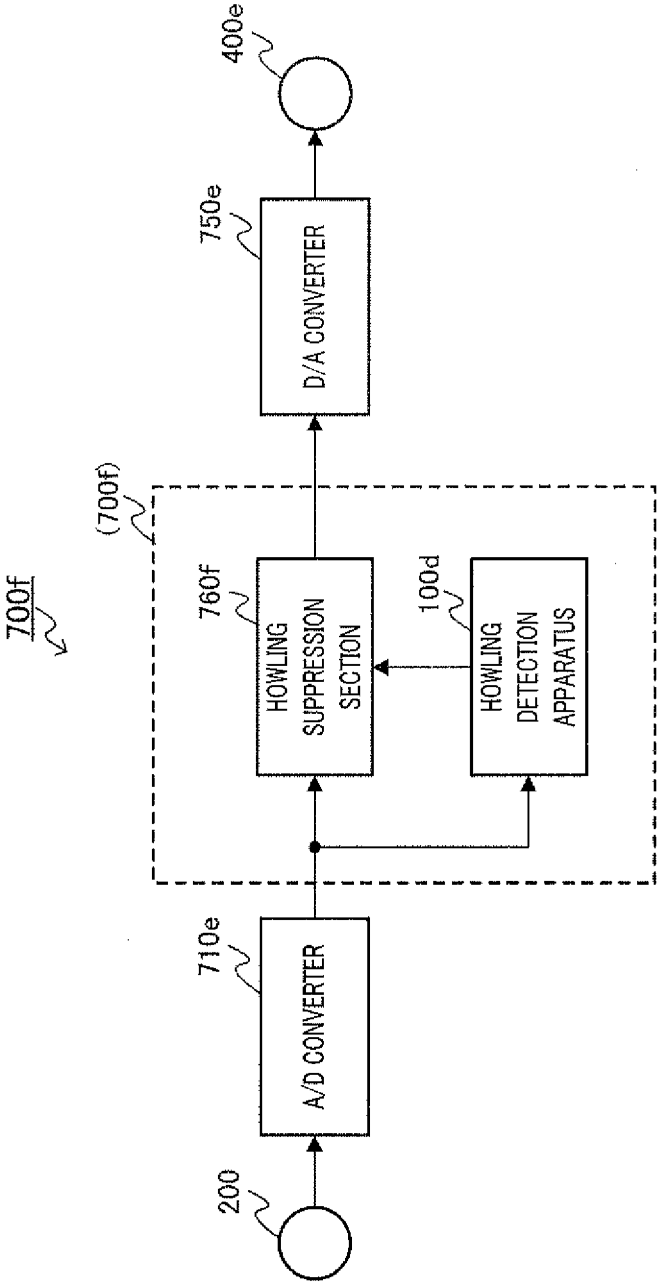
FIG. 14 is a block diagram showing the configuration of a howling suppression apparatus according to Embodiment 4 of the present invention.

FIG. 14 is a block diagram showing the configuration of a howling suppression apparatus according to this embodiment, and corresponds to FIG. 13 of Embodiment 3. Parts in FIG. 14 identical to those in FIG. 13 are assigned the same reference signs as in FIG. 13, and descriptions thereof are omitted here.

In FIG. 14, howling suppression apparatus 700*f* includes input terminal 200, A/D converter 710*e*, howling detection apparatus 100*d* according to Embodiment 2, howling suppression section 760*f*, D/A converter 750*e*, and output terminal 400*e*.

A/D converter 710*e* outputs an A/D-converted input signal to howling detection apparatus 100*d* and howling suppression section 760*f*.

Howling detection apparatus 100*d* performs howling detection from the input signal, and outputs the detection result not to output terminal 400*e* but to howling suppression section 760*f*. Also, when having determined that howling has occurred, howling detection apparatus 100*d* identifies a frequency band in which a peak has occurred (for example, a frequency band for which the third counter value has exceeded the sixth threshold value, hereinafter referred to as a "peak frequency band"), and outputs peak frequency information indicating the peak frequency band to howling suppression section 760*f*.

According to this embodiment, it is assumed that howling detection apparatus 100*d* outputs peak frequency information to howling suppression section 760*f* when having determined that howling has occurred. It is also assumed that howling detection apparatus 100*d* performs notification of howling occurrence and notification of the frequency band in which a peak occurred with peak frequency information output.

Howling suppression section 760*f* outputs the input signal to D/A converter 750*e*. When peak frequency information is input from howling detection apparatus 100*d*, howling suppression section 760*f* reduces the gain of the peak frequency band indicated by the peak frequency information with respect to the input signal using a notch filter. As a result, the gain of the frequency band in which howling occurs is reduced, and howling is suppressed.

Howling suppression apparatus 700*f* can be configured, for example, by means of a computer that includes a CPU, a storage medium such as RAM, and so forth. Also, howling suppression apparatus 700*f* may have a configuration in which input terminal 200, A/D converter 710*e*, D/A converter 750*e*, and output terminal 400*e* are omitted.

Thus, howling suppression apparatus 700*f* according to this embodiment can maintain the gain of another frequency band as far as possible by locally reducing the gain of a frequency band in which howling occurs, and can suppress howling.

Also, howling suppression apparatus 700*f* automatically calculates a threshold value for howling detection according to the acoustic environment in which it is used, and controls the on/off state of gain reduction according to the detection result. By this means, howling suppression apparatus 700*f* can perform howling suppression while avoiding a volume change and sound quality change as far as possible when howling does not occur.

Howling suppression section 760*f* may also convert or divide an input signal into a plurality of frequency components, and reduce peak frequency band gain by performing frequency combination into a temporal signal again after reducing the gain of a frequency band in which howling occurs.

(Other Embodiments)

Embodiments of the present invention are not limited to above-described Embodiment 1 through Embodiment 4. In particular, hardware configurations of an apparatus implementing the present invention may be as follows, for example.

(1) All or part of a howling detection apparatus and howling suppression apparatus is configured by means of a computer system having a microprocessor, ROM (read only memory), RAM, a hard disk unit, and so forth. In this case, a computer program that achieves the same kind of operation as the above-described sections is stored in the RAM or hard disk unit. The functions of the above-described sections are then implemented by having the microprocessor operate in accordance with the computer program.

(2) All or part of a howling detection apparatus and howling suppression apparatus is configured by means of a single system LSI (large scale integration circuit). A system LSI is a super-multifunction LSI constructed by integrating a plurality of configuration parts on a single chip, and more specifically, is a computer system configured with the inclusion of a microprocessor, ROM, RAM, and so forth. In this case, a computer program that achieves the same kind of operation as the above-described sections is stored in RAM or a hard disk unit. The functions of the above-described sections are then implemented by having the microprocessor operate in accordance with the computer program.

(3) All or part of a howling detection apparatus and howling suppression apparatus is configured by means of a removable IC card or unit module. An IC card or module is a computer system configured with the inclusion of a microprocessor, ROM, RAM, and so forth. An IC card or module may be configured with the inclusion of an above super-multifunction LSI. In these cases, the functions of the above-described sections are implemented by having the microprocessor operate in accordance with a computer program. It is desirable for an IC card or module to be tamper-proof.

The category of the present invention is not limited to a physical invention. That is to say, the present invention can be considered as the whole or a part of a method and processing implemented by a howling detection apparatus and howling suppression apparatus rather than a howling detection apparatus and howling suppression apparatus themselves. In this case, the present invention can have the following kinds of aspects.

(4) The present invention is composed of a computer program that implements the above method and processing.

(5) The present invention is composed of a digital signal that stipulates the above computer program. In this case, the computer program can be transmitted via an electrical communication line, a radio communication line, a cable communication line, a network such as the Internet, data broadcasting, or the like, and executed in another computer system independent of the transmission source.

(6) The present invention is composed of an entity that is recorded on a computer-readable recording medium that records the above digital signal. Computer-readable storage media include, for example, a flexible disk, hard disk, CD-ROM, MO (magnet-optics), DVD (digital video disc), DVD-ROM, DVD-RAM, BD (blu-ray disc), semiconductor memory, and so forth. In this case, the computer program can be transferred by transfer of the recording medium, and executed in another computer system independent of the transmission source.

The disclosure of Japanese Patent Application No. 2011-051623, filed on Mar. 9, 2011, including the specification, drawings and abstract, is incorporated herein by reference in its entirety.

INDUSTRIAL APPLICABILITY

The present invention is suitable for use as a howling detection apparatus, howling suppression apparatus, and howling detection method capable of detecting the occurrence of howling with a higher degree of accuracy. More particularly, the present invention is suitable for use in a device that is prone to the occurrence of howling and whose usage environment is not constant, such as a hearing aid or karaoke apparatus.

REFERENCE SIGNS LIST

100, 100*d* Howling detection apparatus
200 Input terminal
300 Howling detection section
310 Signal level calculation section
320 Level fluctuation estimated value calculation section
330 Threshold value calculation section
340 Howling determination section
400, 400*e* Output terminal
500*d* Frequency peak detection section
510*d* Frequency analysis section
520*d* Level calculation section
530*d* Average level calculation section
540*d* Level ratio calculation section
550*d* Howling determination section
600*d* Howling comprehensive determination section
700*e*, 700*f* Howling suppression apparatus
710*e* A/D converter
720*e* Subtracter
730*e* Delay device
740*e* Adaptive filter
750*e* D/A converter
760*f* Howling suppression section

The invention claimed is:

1. A howling detection apparatus comprising:

a signal level calculation section that calculates, from an input signal, an input signal level that is a signal level of said input signal at a predetermined time;

a level fluctuation estimated value calculation section that calculates a level fluctuation estimated value by multiplying a previous level fluctuation estimated value by a predetermined coefficient such that the level fluctuation estimated value gradually increases or gradually decreases by a predetermined amount from said input signal level over time, the predetermined coefficient being determined in accordance with the input signal level;

a threshold value calculation section that calculates, from said level fluctuation estimated value, a level threshold value by changing the level threshold value according to said level fluctuation estimated value; and a howling determination section that determines that howling has occurred in the input signal on a condition that a state in which said input signal level exceeds said level threshold value continues in excess of a predetermined time threshold value.

2. The howling detection apparatus according to claim 1, wherein said level fluctuation estimated value is one of the following: a value that gradually increases by a predetermined amount from a minimum value of said input signal level, a value that gradually decreases by a predetermined amount from a maximum value of said input signal level, or a value that gradually increases or gradually decreases by a predetermined amount from an average value of said input signal level.

3. The howling detection apparatus according to claim 2, wherein said level fluctuation estimated value is a value that is sequentially updated in accordance with a transition of said input signal level, and performs tracking in a state in which an update amount per said predetermined time is limited.

4. The howling detection apparatus according to claim 3, wherein:

said update amount includes an increase amount;

said level fluctuation estimated value calculation section takes a transition of a minimum value of said input signal level as said transition of said input signal level; and said threshold value calculation section takes a value obtained by multiplying said level fluctuation estimated value by a value exceeding 1, or a value obtained by adding a value exceeding 0 to said level fluctuation estimated value, as said level threshold value.

5. The howling detection apparatus according to claim 4, wherein said level fluctuation estimated value calculation section tracks said level fluctuation estimated value for said input signal level without limiting said increase amount in a rise of said input signal level.

6. The howling detection apparatus according to claim 3, wherein:

said update amount includes a decrease amount;

said level fluctuation estimated value calculation section takes a transition of a maximum value of said input signal level as the transition of said input signal level; and said threshold value calculation section takes a value obtained by multiplying said level fluctuation estimated value by a value exceeding 0 and less than 1, or a value obtained by subtracting a value exceeding 0 from said level fluctuation estimated value, as said level threshold value.

7. The howling detection apparatus according to claim 3, wherein:

said update amount includes an increase amount;

said level fluctuation estimated value calculation section takes a transition of a long-term average value of said input signal level as said transition of said input signal level; and said threshold value calculation section takes a value obtained by multiplying said level fluctuation estimated value by a value greater than or equal to 1, or a value obtained by adding a value greater than or equal to 0 to said level fluctuation estimated value, as said level threshold value.

8. The howling detection apparatus according to claim 1, further comprising:

a frequency peak detection section that determines whether or not howling has occurred in said input signal based on presence or absence of a frequency peak of said input signal; and a howling comprehensive determination section that performs final determination that howling has occurred, on the condition that said howling has been determined to have occurred by both said howling determination section and said frequency peak detection section.

9. The howling detection apparatus according to claim 8, wherein said howling comprehensive determination section performs final determination that howling has occurred, on the condition that a difference between a time for which said howling determination section determines said howling to have occurred and a time for which said frequency peak detection section determines said howling to have occurred is within a predetermined range.

10. A howling suppression apparatus comprising:

the howling detection apparatus according to claim 1; and a howling suppression section that performs processing to suppress said howling for said input signal when said howling detection apparatus determines that said howling has occurred.

11. The howling suppression apparatus according to claim 10, wherein said howling suppression section uses an adaptive filter corresponding to a transfer characteristic of an acoustic feedback path of said input signal.

12. The howling suppression apparatus according to claim 10, wherein said howling suppression section reduces a gain of a frequency band in which a frequency peak of said input signal occurs.

13. A howling detection method comprising:

calculating, from an input signal, an input signal level that is a signal level of said input signal at a predetermined time;

calculating a level fluctuation estimated value by multiplying a previous level fluctuation estimated value by a predetermined coefficient such that the level fluctuation estimated value gradually increases or gradually decreases by a predetermined amount from said input signal level over time, the predetermined coefficient being determined in accordance with the input signal level;

calculating, from said level fluctuation estimated value, a level threshold value by changing the level threshold value according to said level fluctuation estimated value; and determining that howling has occurred in the input signal on a condition that a state in which said input signal level exceeds said level threshold value continues in excess of a predetermined time threshold value.

* * * * *